US006873422B2

(12) United States Patent
Nahum et al.

(10) Patent No.: US 6,873,422 B2
(45) Date of Patent: Mar. 29, 2005

(54) SYSTEMS AND METHODS FOR HIGH-ACCURACY DISPLACEMENT DETERMINATION IN A CORRELATION BASED POSITION TRANSDUCER

(75) Inventors: Michael Nahum, Kirkland, WA (US); Patrick H. Mawet, Snohomish, WA (US)

(73) Assignee: Mitutoyo Corporation, Kawasaki (JP)

( * ) Notice: Subject to any disclaimer, the term of this patent is extended or adjusted under 35 U.S.C. 154(b) by 457 days.

(21) Appl. No.: 09/731,671

(22) Filed: Dec. 8, 2000

(65) Prior Publication Data

US 2002/0105656 A1 Aug. 8, 2002

(51) Int. Cl.[7] ................................................ G06K 9/64
(52) U.S. Cl. ........................ 356/614; 382/278; 382/295
(58) Field of Search ................................. 356/614, 615, 356/616; 385/278, 291, 294, 295, 312, 318

(56) References Cited

U.S. PATENT DOCUMENTS

| 4,671,650 A | 6/1987 | Hirzel et al. |
| 4,794,384 A | 12/1988 | Jackson |
| 4,967,093 A | 10/1990 | Takemori |
| 5,453,840 A | 9/1995 | Parker et al. |
| 5,686,720 A | * 11/1997 | Tullis ...................... 250/208.1 |

FOREIGN PATENT DOCUMENTS

| JP | 56-26208 | 3/1981 |
| JP | 60-71911 | 4/1985 |
| JP | 2-297006 | 12/1990 |
| JP | 3-274401 | 12/1991 |
| JP | 4-131705 | 5/1992 |
| JP | 5-52517 | 3/1993 |
| JP | 7-151516 | 6/1995 |
| JP | 8-14824 | 1/1996 |
| JP | 8-233522 | 9/1996 |
| JP | 8-261717 | 10/1996 |
| JP | 8-261730 | 10/1996 |
| JP | 8-271231 | 10/1996 |

OTHER PUBLICATIONS

Hirooka et al., Translation of JP 07–129770, May 19, 1995.*
Yamaguchi, Ichirou et al., "Linear and Rotary Encoders Using Electronic Speckle Correlation," *Optical Engineering*, vol. 30, No. 12, 1991.
Sutton, Michael A. et al., "Effects of Subpixel Image Restoration on Digital Correlation Error Estimates," *Optical Engineering*, vol. 27, No. 10, 1988.
Sjödahl, M. "Accuracy in Electronic Speckle Photography," *Applied Optics*, vol. 36, No. 13, 1997.
Schreier, Hubert et al. "Systematic Errors in Digital Image Correlation Caused by Intensity Interpolation," *Optical Engineering*, vol. 39, No. 11, Nov. 2000.

* cited by examiner

*Primary Examiner*—David V. Bruce
*Assistant Examiner*—Chih-Cheng Glen Kao
(74) *Attorney, Agent, or Firm*—Oliff & Berridge, PLC

(57) ABSTRACT

An image comparison method and an interpolation method to determine the image offset corresponding to the extreme value of the comparison contributes to systematic errors in estimating the displacement of the surface from the images. The systematic errors are rejected by correlation-based comparison systems and methods which reduce the curvature of the correlation function for offsets that bound the extreme value, and by interpolation systems and methods that are relatively insensitive to the asymmetry of the correlation function value points selected as the basis for the interpolation. These systems and methods allow fast, highly accurate, displacement determinations using relatively simplified calculations and relatively few correlation function value points.

38 Claims, 16 Drawing Sheets

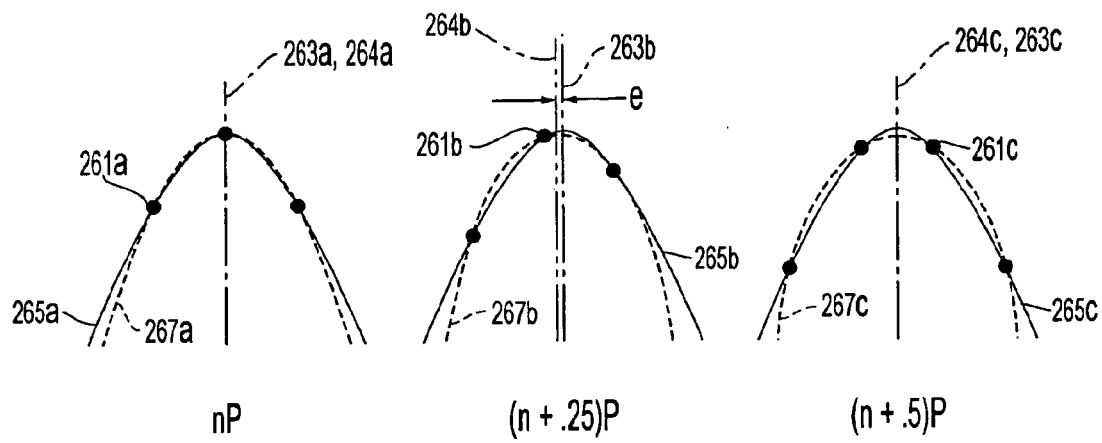
FIG. 3  FIG. 4  FIG. 5
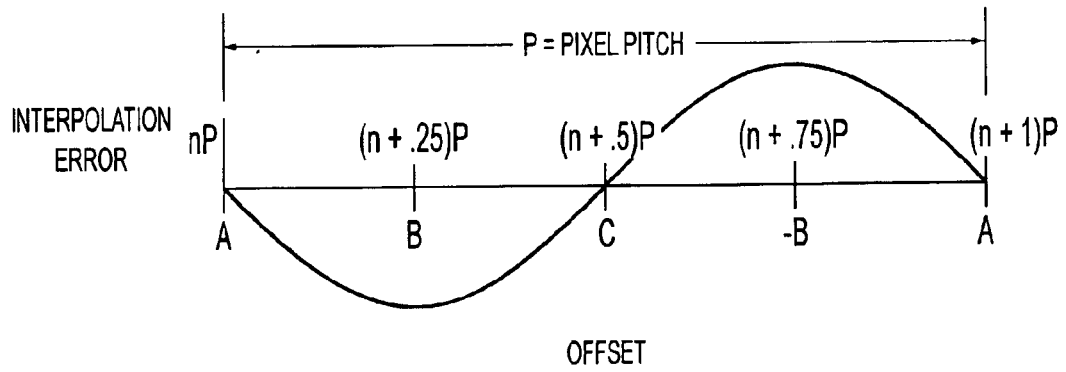
FIG. 6

SYSTEMS AND METHODS FOR HIGH-ACCURACY DISPLACEMENT DETERMINATION IN A CORRELATION BASED POSITION TRANSDUCER

BACKGROUND OF THE INVENTION

1. Field of Invention

This invention is directed to determining positional displacements using image correlation.

2. Description of Related Art

Various known devices use images acquired by an sensor array, and correlation between images acquired by the sensor array to determine deformations and/or displacements. For example, one class of such devices is based on acquiring a speckle image generated by illuminating an optically rough surface with a light source. Generally, the light source is a coherent light source, such as a laser-generating light source. Such laser-generating light sources include, a laser, a laser diode, and the like. After the optically rough surface is illuminated by the light source, the light scattered from the optically rough surface is imaged onto an optical sensor. The optical sensor can be a charge-coupled device (CCD), or a semi-conductor image sensor array, such as a CMOS image sensor array, or the like.

Prior to displacing or deforming the optically rough surface, a first or reference speckle image is captured and stored. Then, after displacing or deforming the optically rough surface, a second or subsequent speckle image is captured and stored. The first and second speckle images are then compared on a pixel-by-pixel basis. In general, a plurality of comparisons are performed. In each comparison, the first and second speckle images are offset, or spatially translated, relative to each other. Between each comparison, the amount of offset, or spatial translation, is increased by a known amount, such as one image element, or pixel, or an integer number of image elements, or pixels.

In each comparison, the image value of a particular pixel in the first image is multiplied by, or subtracted from, the image value of the corresponding second image pixel, where the corresponding second image pixel is determined based on the amount of offset. The value resulting from each pixel-by-pixel operation is accumulated to determine a correlation value for that comparison between the first and second images. That correlation value is then, in effect, plotted against the offset amount, or spatial translation position, for that comparison to determine a correlation function value point. The offset having the greatest correlation between the second and first images will generate a peak or a trough (depending on how the pixel-by-pixel comparison is performed) in the plot of correlation function value points. The offset amount corresponding to the peak or trough represents the amount of displacement or deformation between the first and second speckle images.

For example, U.S. Pat. No. 4,794,384 to Jackson discloses a mouse which uses speckle image correlation to determine displacement of a mouse in two dimensions. In particular, in the 384 patent, for cursor control by a mouse, the speckle image correlation does not need to be performed at a high rate and the accuracy only needs to be on the millimeter range.

U.S. Pat. No. 4,967,093 to Takemori discloses systems and methods for measuring deformation of an object using speckle image correlation. In particular, the 093 patent describes in detail various conventional methods for comparing two speckle images and for determining when to update a current reference speckle image with a new reference speckle image.

The most common method of speckle-image-correlation, disclosed for example in the 093 patent, is based on an auto-correlation function or cross-correlation function that uses multiplicative operations. However, image correlation based on "absolute value of difference" (AVD) operations, such as disclosed in U.S. Pat. No. 4,671,650 to Hirzel is also known and may be applied to speckle images.

The above-described conventional image correlation systems are generally useable only for determining motions and displacements at a relatively coarse level of resolution and accuracy, generally corresponding to the pixel spacing in the imaging system. In image correlation systems where sub-pixel resolution is needed, the sub-pixel resolution is obtained by sub-pixel interpolation. In known laboratory-type systems, sub-pixel interpolation is conventionally performed by fitting a continuous function to the discrete pixel-by-pixel points of a conventional cross-correlation function, locating the extremum, or peak, of the fitted function with sub-pixel resolution, and assuming the extremum, or peak, location is the best estimate of the true offset between the compared images, and thus of the associated displacement. It is also known to apply a similar procedure to synthetic images that are created at sub-pixel steps by interpolating between the adjacent raw pixel values to create synthetic pixel values, as though an image were taken with the pixels located at the desired sub-pixel step location.

It is also known to fit a parabola to the discrete pixel-by-pixel points of a conventional cross-correlation function, in which case the equation of the fit parabola may directly indicate a global coordinate of symmetry, as the best estimate of the true offset between the compared images. Alternatively, it is known to find a global coordinate of symmetry by determining a centroid from the discrete pixel-by-pixel points of a correlation function, or convolving a sawtooth function, or the like, with the discrete pixel-by-pixel points of a correlation function.

SUMMARY OF THE INVENTION

However, inboth conventional devices and laboratory systems that use image correlation in high-accuracy positioning and the like, the practical problems that effectively prevent determining position to a high resolution and accuracy in a commercially marketable form have not been adequately considered. In particular, these conventional devices and high-accuracy laboratory systems and the like have given insufficient consideration to reducing the computational complexity and associated processing time required to determine the displacement to a sub-pixel resolution, while simultaneously achieving an accuracy that is on the same order as the resolution.

For example, in the previously described conventional devices and laboratory systems, the conventional methods of determining the extremum of the correlation function with high accuracy include higher-order curve fitting based on a relatively large number of discrete pixel-by-pixel points of a conventional cross-correlation function, higher-order interpolation of raw pixel data, iterative procedures involving additional correlation calculations, or a combination of all of these methods. Furthermore, in the methods that do not determine the extremum of the correlation function, such as the centroid methods or the convolution methods, the accuracy depends on first determining a relatively large number of discrete pixel-by-pixel points of a correlation function.

Furthermore, for all of the above-outlined conventional methods, it has been observed that systematic errors appear, and the accuracy and meaningful resolution degrades rapidly, when these above-outlined conventional methods are based on lower-order interpolation, relatively fewer discrete pixel-by-pixel points of a correlation function, or relatively fewer iterations of a procedure based on a reduced set of discrete pixel-by-pixel points of a correlation function. Therefore, all of the above-outlined conventional methods are relatively computationally intensive. Thus, the allowable displacement speed, resolution, and accuracy of these conventional systems is limited, especially in combination, and especially in an economical and convenient system of wide utility.

This invention provides improved systems and methods for estimating the sub-pixel displacement of images in correlation-based position transducers and the like.

This invention further provides systems and methods for estimating the sub-pixel displacement of images in correlation-based position transducers and the like that reject the systematic estimation errors present when conventional sub-pixel estimation methods are applied to a limited number of correlation function value points, and especially when the correlation function value points are arranged asymmetrically.

This invention separately provides systems and methods for estimating the sub-pixel displacement of images in correlation-based position transducers and the like with reduced computational complexity and reduced processing time.

This invention separately provides systems and methods for estimating the displacement of speckle-image-correlation-based position transducers with exceptionally high resolution, accuracy, and/or speed.

This invention separately provides speckle-image-correlation based position transducers that have an improved cost/performance ratio.

The systems and methods according to this invention will be described with respect to sensor "images", where the term "image" is not limited to optical images, but refers more generally to any one-dimensionally, two-dimensionally or higher-dimensionally, arranged set of sensor values. Similarly, the term "pixel" as used herein is not limited to optical picture elements, but refers more generally to the granularity of the one-dimensional, two-dimensional, or higher-dimensional, array of sensor values. It should be appreciated that, the term "image" is not limited to entire images, but refers more generally to any image portion consisting of a one-dimensionally, two-dimensionally or higher-dimensionally, arranged set of sensor values.

The systems and methods according to this invention will also be described with respect to the term "symmetry point", that is, a point that is presumed to be on the line of symmetry of a function, or portion of a function, that is presumed to be symmetric. As used herein, any symmetry point is presumed to have an x-coordinate value that corresponds to the extremum of a correlation function region which is presumed to be symmetric. That is, the x-coordinate value of the symmetry point corresponds to the peak offset value of the correlation function. The x-coordinate value of a symmetry point is one example of a coordinate of symmetry determined by "local" analysis. However, a global coordinate of symmetry may also be determined, for example, by the previously discussed conventional methods. Determination of a global coordinate of symmetry is in some cases enhanced by various embodiments of the systems and methods according to this invention.

In various exemplary embodiments of the correlation systems and methods according to this invention, various systematic errors, which arise when conventional sub-pixel interpolation methods are applied to a limited number of correlation function value points, are substantially reduced or rejected. Such errors arise especially when a second image is displaced by a non-integer number of pixels relative to a first image. This occurs generally because the actual correlation function is not precisely known. Therefore, the assumed form of the function used for sub-pixel interpolation only approximates the actual function, and errors arise. The sub-pixel interpolation can be further degraded because it is based on, correlation function value points which are asymmetrically arranged about the extreme value of the peak or trough, i.e., the extremum.

In various exemplary embodiments of the correlation systems and methods according to this invention, such errors are reduced or rejected by interpolating between correlation function value points which are selected from regions of the correlation function peak or trough where there is relatively less curvature in the correlation function.

In various other exemplary embodiments of the correlation systems and methods according to this invention, the accuracy is enhanced by using a correlation function which results in lower curvature for regions on the sides of the correlation peak or trough.

In various other exemplary embodiments of the correlation systems and methods according to this invention, the accuracy is enhanced by predicting the residual errors present in the results of a first part of the method and compensating the results based on the predicted residual errors.

In various other exemplary embodiments of the correlation systems and methods according to this invention, such errors are reduced or rejected by avoiding the use of correlation function value points that lie in regions of the correlation function near the extremum of the correlation function peak or trough; i.e., where there is relatively more curvature in the correlation function.

In various other exemplary embodiments of the correlation systems and methods according to this invention, a coordinate of symmetry, or a symmetry point, corresponding to the offset, or spatial translation position, of the extremum of the correlation function is estimated from a set of correlation function value points having a relatively small range.

In various other exemplary embodiments of the correlation systems and methods according to this invention, a coordinate of symmetry, or a symmetry point, corresponding to the offset, or spatial translation position, of the extremum of the correlation function is estimated from a set of correlation function value points having a relatively small range, based on principles of geometric similarity.

In various other exemplary embodiments of the correlation systems and methods according to this invention, a coordinate of symmetry, or a symmetry point, corresponding to the offset, or spatial translation position, of the extremum of the correlation function is estimated by mirroring characteristics of the correlation function value points on one side of the correlation peak or trough in a way that is consistent with the characteristics of the correlation function value points on the other side of the correlation peak or trough.

In various other exemplary embodiments of the correlation systems and methods according to this invention, a coordinate of symmetry, or a symmetry point, corresponding to the offset, or spatial translation position, of the extremum of the correlation function is estimated based on characterizing the correlation function value points on one side of the correlation peak or trough as though the correlation function value points lay on a function having constant curvature.

In various other exemplary embodiments of the correlation systems and methods according to this invention, the offset, or spatial translation position, corresponding to the extremum of the correlation function is estimated by techniques that are well-suited to be computationally simple and fast, yet accurate.

In various other exemplary embodiments of the correlation systems and methods according to this invention, the systems and methods are particularly well-suited for application to speckle images.

In various other exemplary embodiments the correlation systems and methods according to this invention, the systems and methods are particularly well-suited for application to determining the displacement of speckle-image type readheads at high speed with high accuracy.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail, with reference to the following figures, wherein:

FIGS. 3–5 show in greater detail three versions of the correlation peak in the comparison results shown in FIG. 2, illustrating one source of systematic sub-pixel errors present in prior art image correlation methods;

FIG. 6 illustrates the behavior of the systematic errors of FIGS. 2–5, over an image offset range equal to the pixel pitch in the images;

DETAILED DESCRIPTION OF EXEMPLARY EMBODIMENTS

Figure 1:
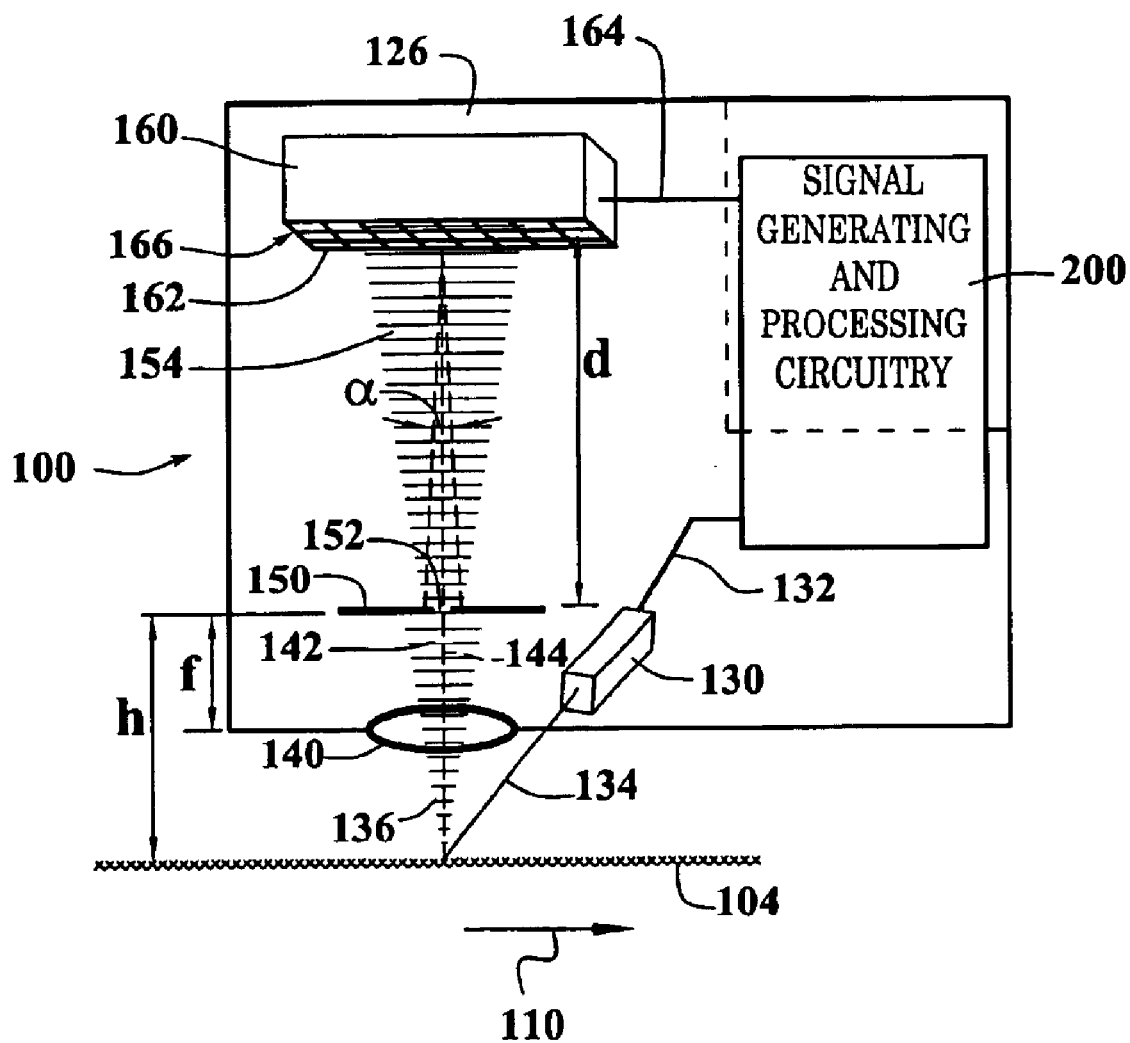
FIG. 1 is a block diagram of a speckle-image-correlation optical position transducer.

FIG. 1 is a block diagram of a speckle-image-based optical position transducer 100. The speckle-image-based optical position transducer 100, as well as various suitable mechanical and optical configurations, image correlation methods, and associated signal processing circuitry are described in greater detail in co-pending U.S. application Ser. No. 09/584,264, incorporated herein by reference in its entirety.

The speckle-image-based optical position transducer 100 shown in FIG. 1 includes a readhead 126, signal generating and processing circuitry 200 and an optically rough surface 104. In FIG. 1, the components of readhead 126, and their relation to the optically rough surface 104, are shown schematically in a layout that generally corresponds to an exemplary physical configuration, as further described below.

In particular, the optically diffusing, or optically rough, surface 104 is positioned adjacent to an illuminating and receiving end of the readhead 126, such that when optically rough surface 104 is illuminated by light emitted from that end of the readhead 126 by a light source 130, the emitted light is scattered back from the optically rough surface 104 towards the image receiving optical elements positioned at that end of the readhead 126. The optically rough surface 104 may be part of a specially-provided element, or it may be provided as an integral surface of a separately-existing mechanism.

In either case, the optically rough surface 104 is positioned at a generally stable distance from the light source and an optical system housed in the readhead 126, and moves relative to readhead 126 along at least one prescribed axis of relative motion, such as a measuring axis 110 in FIG. 1. The relative motion is generally constrained by conventional guideways or bearings (not shown) mounted to a frame that maintains the proper relative position between the readhead 126 and the optically rough surface 104. The readhead 126 may include an alignment feature (not shown) which aids in mounting the readhead 126, and aligns the internal components of the readhead 126 relative to the mounting frame and/or the expected axis of relative motion of the optically rough surface 104.

As shown in FIG. 1, the image receiving optical elements of the readhead 126 include a lens 140 positioned at the illuminating and receiving end of the readhead 126 such that the optical axis of the lens 140 is generally aligned with the illuminated spot on the optically rough surface 104. The readhead 126 further includes a pinhole aperture plate 150, spaced apart from the lens 140 along an optical axis, and a light detector 160 spaced apart from the aperture plate 150 along the optical axis, as shown in FIG. 1. The light detector 160 can be any known or later-developed type of light sensitive material or device that can be organized into an array of independent and individual light sensing elements, such as a camera, an electronic or digital camera, a CCD array, an array of CMOS light sensitive elements, or the like.

An exemplary spacing and positioning of the optically rough surface 104 and the readhead 126, including the lens 140, the aperture plate 150, and the light detector 160, is further described below and in the incorporated 264 application. The mounting of the light source 130, the lens 140, the aperture plate 150, and the light detector 160 in the housing of the readhead 126 may be done according to conventional methods of miniature optical system construction and/or industrial camera construction, provided that the components are mounted in a precise and stable manner.

When the readhead 126 is suitably positioned adjacent to the optically rough surface 104, each image captured by the light detector 160 will contain a random pattern of relatively bright spots, or speckles, where the diffracted light waves from the optically rough surface 104 combine positively to form a peak, and relatively dark spots where the diffracted light waves from the optically rough surface 104 combine negatively to cancel out. The random pattern corresponding to any illuminated portion of the optically diffusing, or optically rough, surface 104 is unique, and the optically rough surface 104 can therefore act as a displacement reference without the need for any special marks.

The light detector 160 has an array 166 of image elements 162 spaced apart along at least one axis at a known spacing. The known spacing provides the basis for measuring the displacement or offset between two images projected onto the light detector 160, and thus also provides the basis for measuring the displacement of the surface that determines the images, i.e., the optically rough surface 104.

In addition, the readhead 126 includes at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually addressed to output a value representing the light intensity on that image element 162 over the signal line 164 to the signal generating and processing circuitry 200. Additional portions of the signal generating and processing circuitry 200 may be placed remotely from the readhead 126, and the functions of the readhead 126 can be operated and displayed remotely. The signal generating and processing circuitry 200 is described in greater detail below, with respect to FIG. 17.

Additional details regarding the structure and operation of this and other embodiments of the speckle-image-based optical position transducer 100 are provided below, and in the incorporated 264 application.

As shown in FIG. 1, a light beam 134 is emitted by the light source 130 and is directed onto the optically diffusing, or optically rough, surface 104 to illuminate a portion of the optically diffusing, or optically rough, surface 104. As a result, the illuminated portion of the optically diffusing, or optically rough, surface 104 both scatters and diffracts light about the optical axis 144.

When the light source 130 is a white-light source, the light will generate an image of the illuminated portion, which can be projected onto the array 166 of the image elements 162. However, while this image can be correlated in the same way that a speckle image can be correlated, this image will not include speckles formed by scattering from the optically diffusing, or optically rough, surface 104.

When the light source 130 is coherent and is driven by the drive signal on the signal line 132 and outputs the light beam 134 as a coherent light beam, the coherent light beam 134 illuminates a portion of the optically diffusing, or optically rough, surface 104. The illuminated portion lies along the optical axis 144 of the optical system of the readhead 126. In particular, the light 136 scattered from the illuminated portion of the optically diffusing, or optically rough, surface 104 is gathered by the lens 140.

The lens 140 then projects the collected light 142 from the illuminated portion of the optically diffusing, or optically rough, surface 104 onto the pinhole aperture plate 150 having the pinhole aperture 152. The lens 140 is spaced from the plate 150 by a distance f, which is equal to the focal length of the lens 140. The pinhole aperture plate 150 is spaced from the illuminated portion of the optically diffusing, or optically rough, surface 104 by a distance h.

By locating the plate 150 at the focal distance f of the lens 140, the optical system of the speckle-image-based optical position transducer becomes telecentric. Moreover, by using the pinhole 152 in the pinhole plate 150, the speckle size and the dilation of the speckle pattern depends solely on the dimensions of the pinhole 152 and, more particularly, becomes independent of any lens parameters of the lens 140.

The collected light 142 from the lens 140 passes through the pinhole 152. In particular, the light 154 passed by the pinhole 152 is projected along the optical axis 144 and onto the array 166 of the image elements 162 of the light detector 160. The surface of the array 166 of the light sensitive elements 162 is separated from the plate 150 by a distance d. The speckle size depends only on the angle α subtended by the dimensions of the pinhole 152 and a distance d between the pinhole plate 150 and the surface formed by the array 166 of image elements 162 of the light detector 160.

The approximate size D of the speckles within the detected portion of the light received from the illuminated portion of the optically diffusing, or optically rough, surface 104 onto the array 166 of the image elements 162 is:

$$D \approx \lambda/\tan(\alpha) = (\lambda * d)/w \quad (1)$$

where:
$\lambda$ is the wavelength of the light beam 134;
d is the distance between the pinhole plate 150 and the surface of the array 166;
w is the diameter of a round pinhole 152; and
$\alpha$ is the angle subtended by the dimension w at a radius equal to distance d.

In various exemplary embodiments, typical values for these parameters of the optical position transducer 100 include: $\lambda = 0.6$ $\mu$m, d=10 cm ($10^5$ $\mu$m), and w=1 mm ($10^3$ $\mu$m). As a result, the approximate speckle size D is 60 $\mu$m.

To achieve high resolution, the average speckle size is most usefully approximately equal to, or larger than, the pixel size of the image elements 162 of the light detector 160. Moreover, in various embodiments of the readhead 126, the average speckle size is approximately two times to ten times the pixel spacing of the image elements 162.

To acquire an image, the signal generating and processing circuitry 200 outputs a drive signal on the signal line 132 to drive the coherent light source 130 to emit the coherent light beam 134. The light beam 134 illuminates a portion of the optically rough surface 104, which is imaged onto the array 166 of the image elements 162 of the light detector 160. The signal generating and processing circuitry 200 then inputs a plurality of signal portions over the signal line 164, where each signal portion corresponds to the image value detected by one or more of the individual image elements 162.

To determine a displacement of the optically rough surface 104, for a first image, the signal portions received from the light detector 160 by the signal generating and processing circuitry 200 are stored in memory. A short time later, the signal generating and processing circuitry 200 again drives the coherent light source 130 and inputs a second image signal from the light detector 160 over the signal line 164. Generally, the second image must be generated and acquired within a short time period after the first image is acquired, depending on the displacement speed of the optically rough surface 104. The time period must be short enough to insure that the first and second images "overlap" sufficiently. That is, the time period must be short enough to insure that a pattern of image values present in the first image is also present in the second image, so that a significant correlation between the two images can be determined.

However, in some exemplary embodiments, it may be desirable to store a "permanent" reference image corresponding to a particular position for long time periods. That image can then be recalled at any later time to be used in place of the first or second images. For example, such an image might correspond to any reference position, or a "homing", position of a device. In this case, small deviations from the reference position, or the "homing", position can be detected at any later time. These small deviations can be detected by comparing the permanent reference image to an image acquired at the later time. Thus, it should be understood that, in various exemplary embodiments of the systems and methods according to this invention, images stored for long time periods may always be used in place of the first or second images, and compared to a current second or first image, when it is appropriate for the system application.

The second and first images are processed to generate a correlation function. In practice, the second image is shifted digitally relative to the first image over a range of offsets, or spatial translation positions, that includes an offset that causes the pattern of the two images to most nearly align. The correlation function indicates the degree of pattern alignment, and thus indicates the amount of offset required to get the two images to align as the images are digitally shifted.

When each of the first and second images comprises M×N pixels arranged in a two-dimensional array of M rows of pixels and N columns of pixels, one common correlation algorithm is:

$$R(p) = \left[ \sum_{q=1}^{M} \left( \sum_{m=1}^{N} I_1(m, q) * I_2(p+m, q) \right) \right] / M \quad (2)$$

where:
p is the current offset value, in pixels;
R(p) is the correlation function value for the current offset value;
q is the current row;
m is the current pixel for the current row;
$I_1$ is the image value for the current pixel in the first image; and
$I_2$ is the image value for the second image.

It should be appreciated that cyclical boundary conditions are assumed. As indicated in Eq. (2), the correlation value for each row is obtained and the row correlation values are summed. The sum is then averaged over the M rows to obtain an average, and noise-reduced, correlation function value point. This averaging is desirable to ensure that the correlation function value points will be stable to roughly the resolution to be obtained by interpolating to determine the correlation function extremum. Thus, to obtain roughly nanometer resolution by interpolating to determine the correlation function extremum when each correlation function value point is offset by approximately 1 $\mu$m from adjacent correlation function value points, it is assumed that the correlation function value points need to be stable roughly to the desired nanometer resolution value. method. In particular, the correlation function includes a plurality of discrete correlation function value points 204 that are separated along the x-axis by a predetermined offset increment corresponding to the pixel pitch P, as indicated by the distance 208. The predetermined offset increment can be directly related to a displacement increment of the optically rough surface 104 shown in FIG. 1. This displacement increment depends upon the effective center-to-center spacing between the individual image elements 162 of the array 166 in the direction corresponding to the measurement axis 110, which is also referred to as the pixel pitch P, in the following description, and the amount of magnification of the displacement of the optically diffusing, or optically rough, surface 104 by the optical system of the readhead 126.

For example, if the effective center-to-center spacing of the image elements 162 in the direction corresponding to the measurement axis 110 is 10 $\mu$m, and the optical system of the readhead 126 magnifies the surface displacement by 10×, then a 1 $\mu$m displacement of the illuminated portion of the optically diffusing, or optically rough, surface 104 will be magnified into a 10 $\mu$m displacement of the speckle pattern on the image elements 162.

Each correlation function value point 201 is generated by digitally shifting the second image relative to the first image by the effective center-to-center spacing of the image elements 162 in the direction corresponding to the measurement axis 110. Because, in this case, the effective center-to-center spacing of the image elements 162 corresponds to a 1 µm displacement of the optically diffusing, or optically rough, surface 104, the discrete correlation function value points 201 will be separated by a displacement distance of about 1 µm. In particular, the correlation function of FIG. 2, which has correlation function values displayed in arbitrary units, will exhibit an extremum of the true continuous correlation function 205 at the offset value, or spatial translation position, where the image, or intensity, patterns in each of the first and second images best align.

Herein, the offset value in pixels associated with the extremum of a true continuous correlation function will be called the peak offset regardless of whether the underlying correlation function produces a peak or a trough, and the surface displacement corresponding to the peak offset will be called the peak displacement, or simply the displacement, regardless of whether the underlying correlation function produces a peak or a trough.

Figure 2:
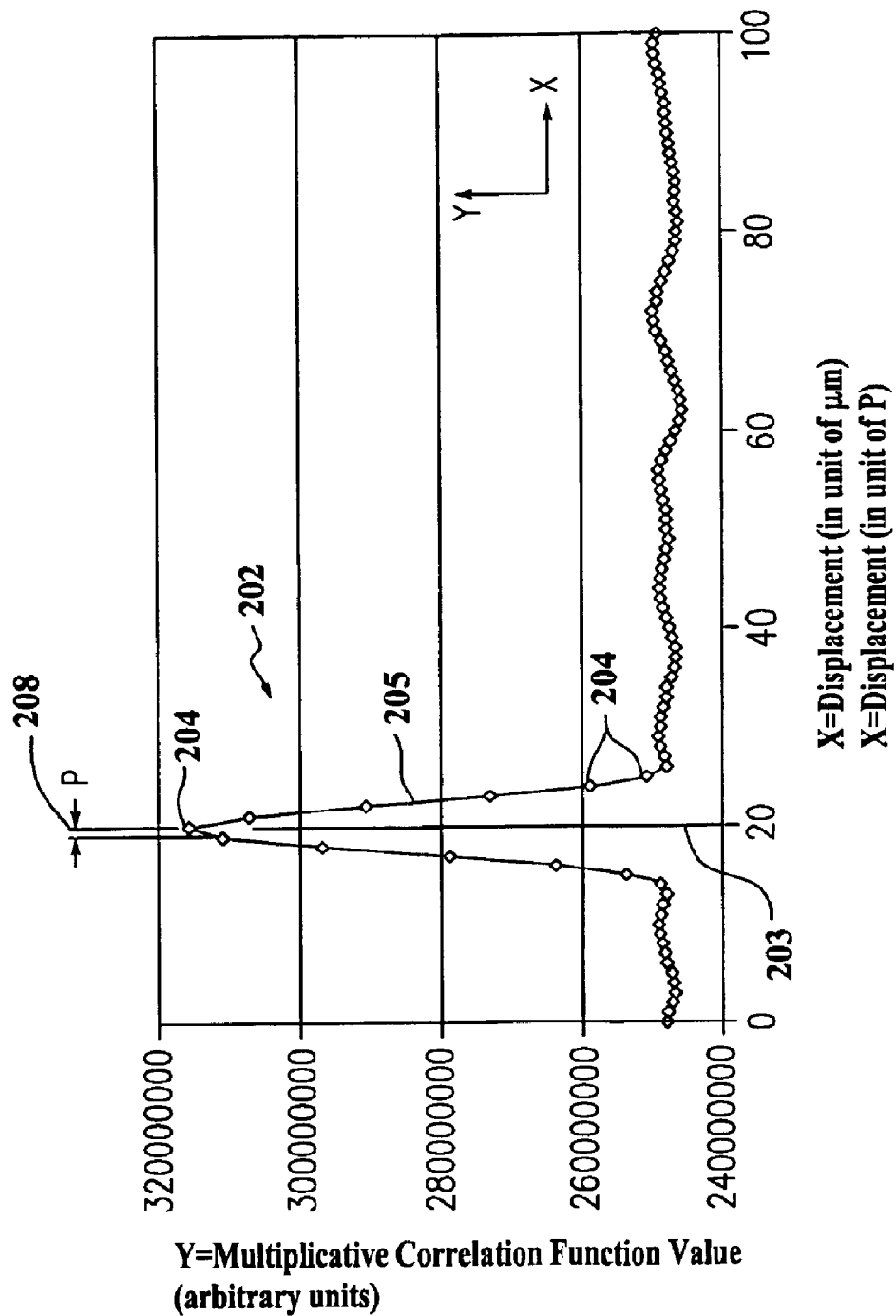
FIG. 2 is a graph illustrating the results of comparing first and second images by a conventional multiplicative correlation function, when the images are offset at various pixel displacements.

In the example shown in FIG. 2, the extremum of the true continuous correlation function 205 occurs at an offset of approximately 20 pixels or image elements 162, corresponding to a displacement of 20 µm, as indicated by the line 203. In FIG. 2, the extremum of the true continuous correlation function 205 is indistinguishable from the extreme correlation function value point 204. However, in general, the extremum does not necessarily occur at an offset, or spatial translation position, which is an integer multiple of the pixel spacing, and therefore does not precisely coincide with the extreme correlation function value point.

Conventionally, if sub-pixel resolution and accuracy are required, a function f(x) is numerically-fit to the correlation function value points which make up the correlation peak 202. Subsequently, the extremum for the numerically-fit function f(x) is found and the corresponding offset value, or spatial translation position, is identified as the best estimate of the peak offset for the first and second images. For example, to find the offset value corresponding to the extremum for the numerically-fit function f(x), the numerically-fit function f(x) is differentiated to determine the offset value x where the slope of f(x) is equal to zero.

When a multiplicative correlation function such as Eq. (2) is used, the correlation function is relatively curved in the region surrounding the peak or trough. Thus, the numerically-fit function f(x) is conventionally chosen to be a second-order or higher function. However, the inventors have found that such conventional methods for estimating the correlation function extremum introduce significant systematic errors, such as those illustrated in FIGS. 3–5. It is desirable to use relatively few correlation function value points, from the standpoint of the computational speed of the methods and corresponding systems that estimate the correlation function extremum and determine the corresponding displacement.

FIGS. 3–5 illustrate the systematic errors arising when a second image is displaced by a non-integer number of pixels relative to the first image, such as, for example, when the displacement of the optically rough surface 104 between first and second images does not correspond to an integer number of pixels of the array 166 of the image elements 162. These errors occur because the actual correlation function is generally not precisely known and is therefore different from the function fit to the correlation function value points. Furthermore, only a limited number of correlation function value points are used to generate the numerically-fit function. Therefore, an asymmetrical arrangement of correlation function value points, which is the typical practical case, will lead to errors.

FIG. 3 illustrates the relationship between the true continuous correlation function 265a and the numerically-fit function 267a, when the second image is displaced by an integer number of pixels relative to the first image, i.e., by (n*P), where n is an integer and P is the pixel pitch. Thus, the extremum of the true continuous correlation function 265a corresponds exactly to one of the correlation function value points 261a obtained by digitally offsetting the images in increments of the pixel pitch P.

Furthermore, the correlation function value points 261a are symmetrical around the centerline of the true continuous correlation function 265a, assuming a symmetrical correlation function. Thus, so long as the numerically-fit interpolation function f(x) 267a is symmetrical, there need be no error in the offset of the estimated extremum, even if the interpolation function 267a is not identical to the true continuous correlation function 265a. Accordingly, in FIG. 3, the lines representing the true peak offset 263a and the estimated peak offset 264a coincide. As a result, the error in estimating the peak offset is essentially zero.

FIG. 4 illustrates the relationship between the true continuous correlation function 265b and the numerically-fit function 267b, when the second image is displaced by a non-integer number of pixels relative to the first image. In FIG. 4, the image offset is equal to (n+0.25)P, where n is an integer and P is the pixel pitch. Thus, the extremum of the true continuous correlation function 265b falls between the correlation function value points 261b obtained by digitally offsetting the images in increments that are multiples of the pixel pitch. Furthermore, in this case, the correlation function value points 261b are not located symmetrically about the centerline 263b of the true continuous correlation function 265b.

Thus, if the numerically-fit function f(x) 267b does not match the true continuous correlation function 265b, the numerically-fit interpolation function f(x) 267b will be displaced relative to the true continuous correlation function 265b. Accordingly in the case shown in FIG. 4, the lines representing the true peak offset 263b and the estimated peak offset 264b do not coincide. Thus, an error is present in the estimate of the peak offset, equal to the error "e" in FIG. 4. While it is reasonable to think that using additional correlation function value points to estimate the numerically-fit interpolation function 267b can reliably reduce this error, the inventors have found that such conventional methods have not performed as well as the systems and methods of this invention, for a limited number of correlation function value points.

Firstly, as previously stated, the form of the numerically-fit interpolation function 267b is only an approximation of the true continuous correlation function 265b. Secondly, as the number of correlation function value points increases, conventional curve-fitting methods may estimate the numerically-fit interpolation function 267b such that it fits all correlation function value points reasonably well, but coincides with none. Thus, it has been found that the errors resulting from such an approach have exceeded those achieved when using the systems and methods of this invention.

FIG. 5 illustrates the relationship between the true continuous correlation function 265c and the numerically-fit function 267c, when the second image is displaced by another non-integer number of pixels relative to the first image. In FIG. 5, the image offset is equal to (n+0.5)P, where n is an integer and P is the pixel pitch. Thus, the extremum of the true continuous correlation function 265c falls exactly halfway between the correlation function value points 261c obtained by digitally offsetting the images in increments that are multiples of the pixel pitch.

Furthermore, the correlation function value points 261c are symmetrical around the centerline 263c of the true continuous correlation function 265c, assuming a symmetrical correlation function. Thus, so long as the numerically-fit interpolation function f(x) 267c is symmetrical, there need be no error in the offset of the estimated extremum, even if the interpolation function 267c is not identical to the true continuous correlation function 265c. Accordingly, the lines representing the true peak offset 263c and the estimated peak offset 264c coincide, and the error in estimating the peak offset is again essentially zero.

FIG. 6 illustrates the qualitative behavior of the systematic errors illustrated in FIGS. 3–5, over an image offset range equal to the pixel pitch in the images. The errors at image offset positions corresponding to the cases of FIGS. 3–5 are indicated. Positions corresponding to those shown in FIG. 3, FIG. 4 and FIG. 5 are labeled A, B and C, respectively. Also, the error at an image offset position of (n+0.75) P is indicated at a position labeled–B. FIG. 6 shows that systematic sub-pixel interpolation errors result from conventional methods for estimating the peak offset. These errors are systematically larger when the arrangement of the correlation function value points is asymmetric about the peak offset, and are periodic over a spatial wavelength corresponding to the pixel pitch P. These periodic errors, present in conventional sub-pixel interpolation methods, are quantitatively compared to those resulting from the systems and methods of this invention, for some typical images, in the following discussion.

Figure 7:
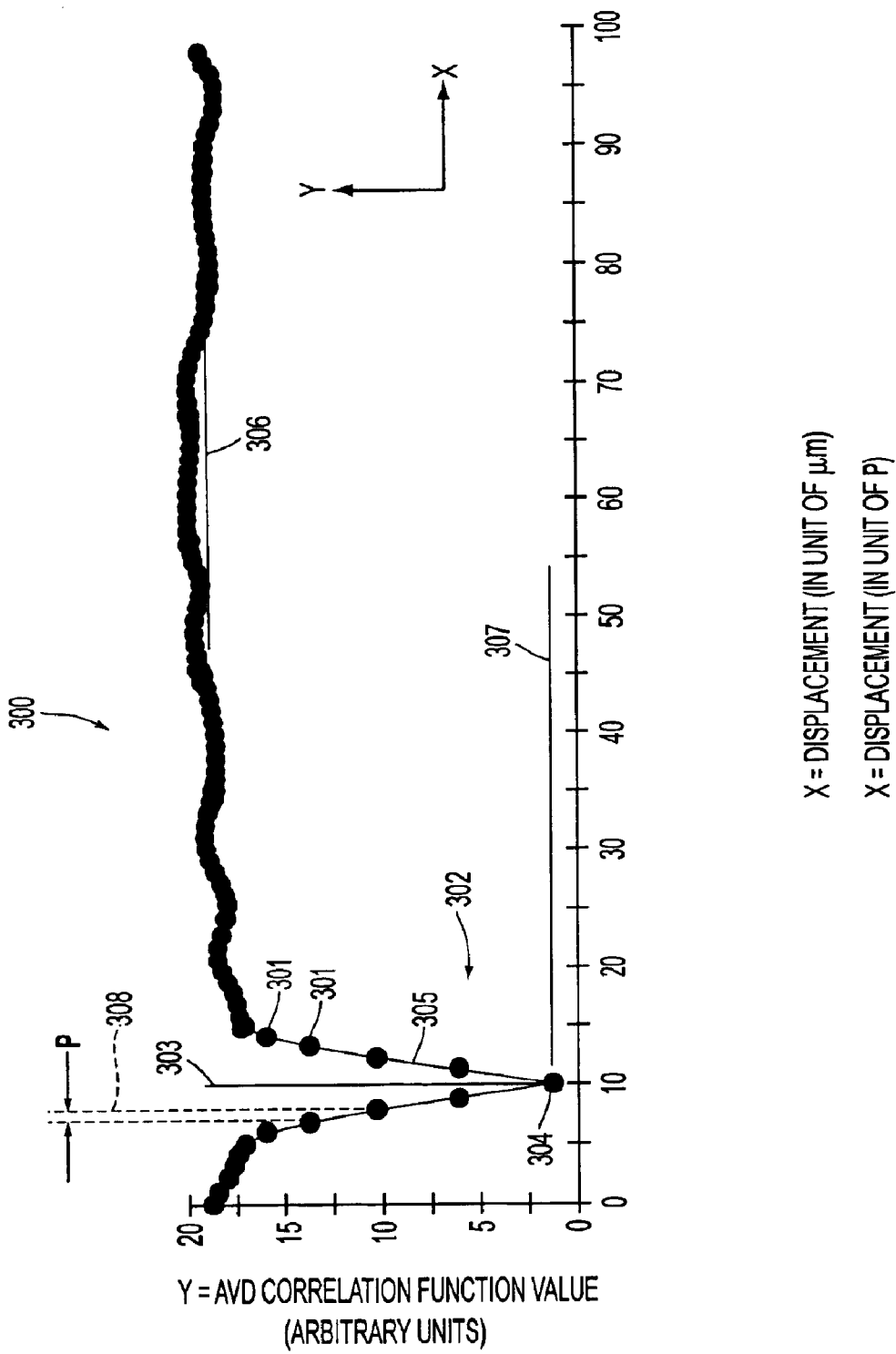
FIG. 7 is a graph illustrating the results of comparing first and second images by an absolute value of difference correlation function, when the images are offset at various pixel displacements.

FIG. 7 is a graph illustrating the results of comparing first and second images according to one exemplary embodiment of an absolute value of difference correlation function 300 useful in conjunction with the systems and methods of this invention. Rather than use a product, as shown in Eq. (2), the absolute difference can be used in the correlation function:

$$R(p) = \sum_{q=1}^{k} \sum_{m=1}^{M} |I_1(m, q) - I_2(m + p, q)| \quad (3)$$

As previously mentioned, the multiplicative correlation function of Eq. (2) tends to result in a correlation function which exhibits relatively more curvature in the side regions of the correlation function peak or trough. In contrast, as shown in FIG. 7, the inventors have found that the absolute value of difference correlation function 300, based on Eq. (3), tends to result in relatively less curvature in the region corresponding to the sides of the correlation function peak or trough, as indicated by side region 302 in FIG. 7. Relatively less curvature in the side regions of the correlation peak or trough allows such side regions to be accurately represented with relatively simple low-order approximations.

In particular, the correlation function 300 includes a plurality of discrete correlation function value points 301 that are separated along the x-axis by a predetermined offset increment corresponding to the pixel pitch P, as indicated by the distance 308. The predetermined offset increment can be directly related to a displacement increment of the optically rough surface 104 shown in FIG. 1. This displacement increment depends upon the effective center-to-center spacing between the individual image elements 162 of the array 166 in the direction corresponding to the measurement axis 110, that is, the pixel pitch P, and the amount of magnification of the displacement of the optically diffusing, or optically rough, surface 104 by the optical system of the readhead 126.

For example, if the effective center-to-center spacing of the image elements 162 of the array 166 in the direction corresponding to the measurement axis 110 is 10 μm, and the optical system of the readhead 126 magnifies the surface displacement by 10×, then a 1 μm displacement of the illuminated portion of the optically diffusing, or optically rough, surface 104 will be magnified into a 10 μm displacement of the speckle pattern on the image elements 162 of the array 166.

Each correlation function value point 301 is generated by digitally shifting the second image relative to the first image by the effective center-to-center spacing, or pixel pitch, of the image elements 162 of the array 166 in the direction corresponding to the measurement axis 110. Because, in this case, the effective center-to-center spacing, or pixel pitch, of the image elements 162 of the array 166 corresponds to a 1 μm displacement of the optically diffusing, or optically rough, surface 104, the discrete correlation function value points 301 will be separated in this case by a displacement distance of about 1 μm. In particular, the correlation function 300 of FIG. 7, which has correlation function values displayed in arbitrary units, will exhibit an extremum of the true continuous correlation function 305 at the offset value where the image, or intensity, patterns in each of the first and second images best align.

Herein, the offset value in pixels associated with the extremum of a true continuous correlation function will be called the peak offset regardless of whether the underlying correlation function produces a peak or a trough, and the surface displacement corresponding to the peak offset will be called the peak displacement, or simply the displacement, regardless of whether the underlying correlation function produces a peak or a trough.

In the exemplary embodiment shown in FIG. 7, the extremum of the true continuous correlation function 305 occurs at a peak offset of approximately 10 pixel spacing increments, or 10 times the pixel pitch, corresponding to a displacement of approximately [(10 μm image offset/P)* (10P)*(1 μm displacement/10 μm image offset)]=10 μm displacement. In FIG. 7 the extremum of the true continuous correlation function 305 is indistinguishable from the extreme correlation function value point 304. However, in general, the extremum does not occur at an offset which is an integer multiple of the pixel spacing, and therefore does not precisely coincide with the extreme correlation function value point.

The systems and methods disclosed herein are, in various exemplary embodiments, used to estimate the x-coordinate value of the actual peak offset or peak displacement from a selected set of the correlation function value points 301. The x-coordinate value of the actual, or true, peak offset or peak displacement is indicated by a line 303 extending parallel to the y-axis and containing the point which is the extremum of the true continuous correlation function 305. Assuming that the true continuous correlation function 305 is symmetric in the region 302, any point on the line 303 is indicative of the x-coordinate value of the peak offset or peak displacement of the true continuous correlation function 305 at a sub-pixel accuracy.

In general, only the discrete correlation function value points 301 that have values that are substantially different than the noise level or average value 306 are used in the systems and methods of this invention. That is, only correlation function value points that lie within the region 302 are used. The correlation function value of the extreme correlation function value point, indicated by the line 307, may be used in conjunction with the value of the noise level or average value 306 to normalize the correlation function value point values in the region 302, so that the correlation function value points can be selected according to a normalized value range, in some exemplary embodiments.

Throughout the following discussion, the correlation function value points will be assigned coordinates $(x_i, y_i)$ according to a coordinate system as defined in FIG. 7, where i is an integer corresponding a particular correlation function value point. Accordingly, the straight line joining any pair of adjacent correlation function value points will have a slope:

$$S_{i\ i+1}=(y_{i+1}-y_i)/(x_{i+1}-x_1) \qquad (4)$$

Other points on the figures, or identified in the discussion, are also assumed to have similar designated coordinates and associated slopes in the same coordinate system.

It should be appreciated that, in many of the following embodiments of the systems and methods according to this invention, in contrast to the requirement of many conventional methods, characterizing the correlation function in the vicinity of the extremum of the correlation function is avoided. This is because the shape of the correlation function near the extremum exhibits a high curvature and is not well-approximated by sparse correlation function value points or simple lower-order functions.

Because various exemplary embodiments of the systems and methods according to this invention are directed to reducing the computational complexity and the associated processing time without sacrificing sub-pixel interpolation accuracy, the inventors have determined that a superior estimate of the x-coordinate value of the peak offset can be derived from correlation function value points located in regions away from high correlation function curvature in the vicinity of the correlation function extremum. In contrast with conventional methods, it should be appreciated that, in various embodiments of the systems and methods according to this invention, the correlation function can be well-approximated, and/or the x-coordinate value of the peak offset may be accurately determined, based on relatively few correlation function value points that are located outside the high-curvature vicinity of the correlation function extremum.

In contrast with conventional methods, various embodiments of the systems and methods according to this invention do not depend on using and/or determining correlation function value points in the vicinity of the correlation function extremum in order to achieve accurate sub-pixel interpolation. In general, various ones of the above features according to various exemplary embodiments of the systems and methods of this invention also increase the robustness of the sub-pixel interpolation.

Figure 8:
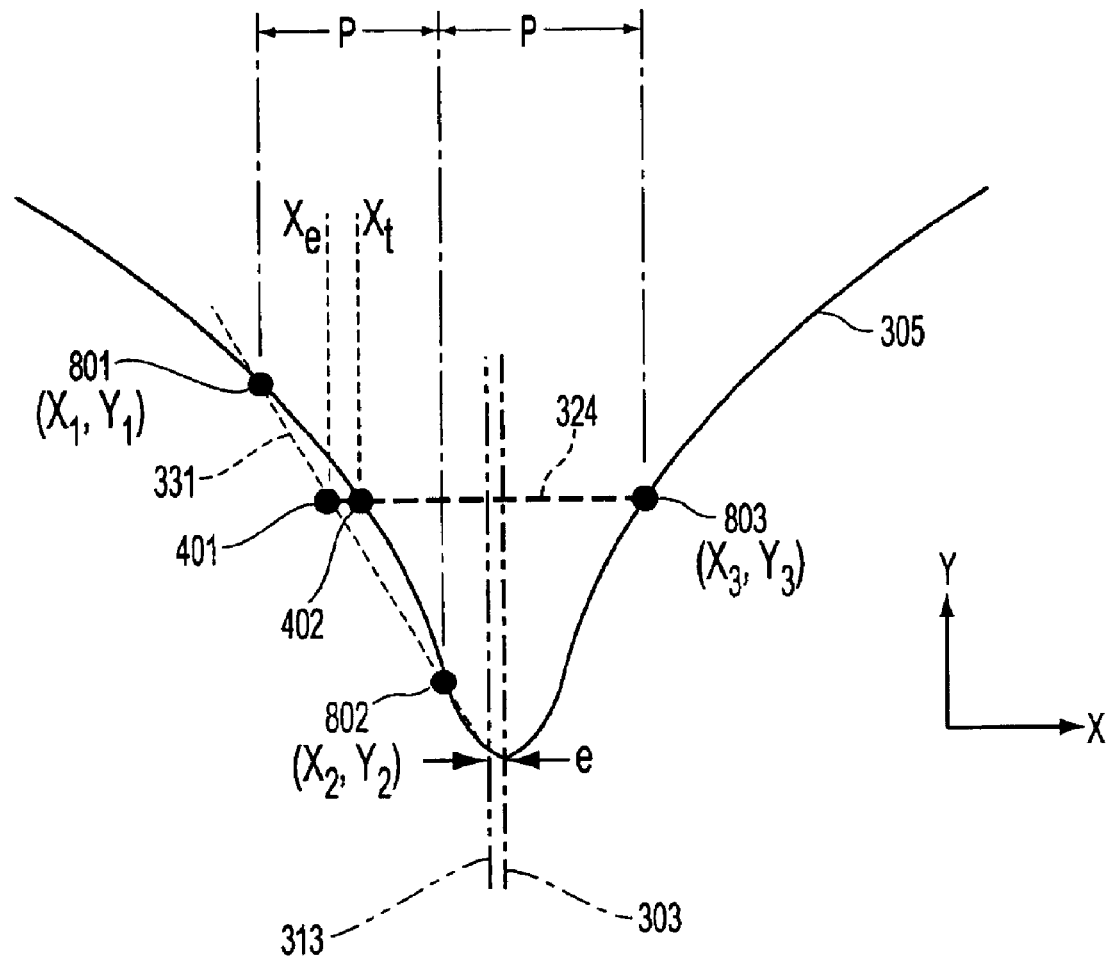
FIG. 8 is a graph showing three discrete correlation function value points in the region near an absolute value of difference correlation function trough extremum (minimum value), illustrating a first exemplary embodiment of the systems and methods for estimating displacement according to this invention.

FIG. 8 shows a first exemplary embodiment of the systems and methods for estimating the peak offset or displacement according to this invention. It should be appreciated that the curvatures and x-scale of the functions shown in FIG. 8 and following figures are exaggerated for purposes of illustration. A number of correlation function value points 801, 802, and 803 are spaced apart by an offset increment equal to P, as previously described. The correlation function value points 801, 802, and 803 are determined using the absolute value of difference correlation function and presumably lie on the true continuous correlation function 305.

In this first exemplary embodiment of the systems and methods according to the invention, two correlation function value points lying on a first side of the true continuous correlation function extremum, such as the correlation function value points 801 and 802, are identified. A unique line 331 passing through the correlation function value points 801 and 802, and having a slope $S_{12}$, is constructed. A third correlation function value point lying on the opposite side of the true continuous correlation function extremum, such as the correlation function value point 803, is identified. The y-coordinate value $y_3$, that is, the y-coordinate value of the correlation function value of the third correlation function value point 803, is usually, but not necessarily, between the y-coordinate values $y_1$ and $y_2$ of the first two correlation function value points 801 and 802.

Next, an estimated point 401 on the line 331 that has a y-coordinate value equal to the coordinate $y_3$, is identified. The line 324, extending parallel to the x-axis in FIG. 8, indicates the y-coordinate value $y_3$, for purposes of illustration. Thus, the line segment 324 intersects with the line 331 at the estimated point 401. The x-coordinate value of this estimated point 401, $x_e$, is an estimate of the true x-coordinate value $x_t$ of a point 402 lying on the curve of the true continuous correlation function 305, and symmetrically located about the extremum, or peak offset, of the true continuous correlation function 305 relative to the correlation function value point 803. Given $x_e$ and $x_3$, the peak offset can be estimated as the x-coordinate value midway between $x_e$ and $x_3$, that is, the x-coordinate value of the line 313 that extends parallel to the y-axis and that bisects the line segment 324:

$$x_{peak\ offset}=(x_e+x_3)/2 \qquad (5)$$

As shown, the estimated peak offset, i.e., the x-coordinate value of the line 313, approximates the true peak offset, i.e., the x-coordinate value of the line 303. The error e is approximately $(x_e-x_t)/2$.

The inventors have observed approximately 50% lower periodic sub-pixel errors when using this first exemplary embodiment of the systems and methods according to this invention, compared to the previously-discussed conventional method of fitting a quadratic curve to a multiplicative correlation function, when the curve-fitting techniques are performed on the same images using a similar number of correlation function value points. Therefore, this first exemplary embodiment of the systems and methods according to this invention provides improved sub-pixel interpolation and rejects a significant portion of the systematic estimation errors that occur with previous conventional sub-pixel interpolation methods due to asymmetry of the correlation function value points relative to the true extremum, or peak offset. However, this first exemplary embodiment of the systems and methods according to this invention is not necessarily completely free of error.

It should be appreciated that in this first exemplary embodiment of the systems and methods according to this invention, symmetrically located correlation function value points are estimated, and the midpoint of an associated line is found to define the extremum, or peak offset. However, substantially equivalent results can be obtained by changes to the first exemplary embodiment of the systems and methods according to this invention, such as locating the x-coordinate value of the intersection of two symmetric lines located through the correlation function value points, in an analogy of the first exemplary embodiment of the systems and methods according to this invention.

Figure 19:
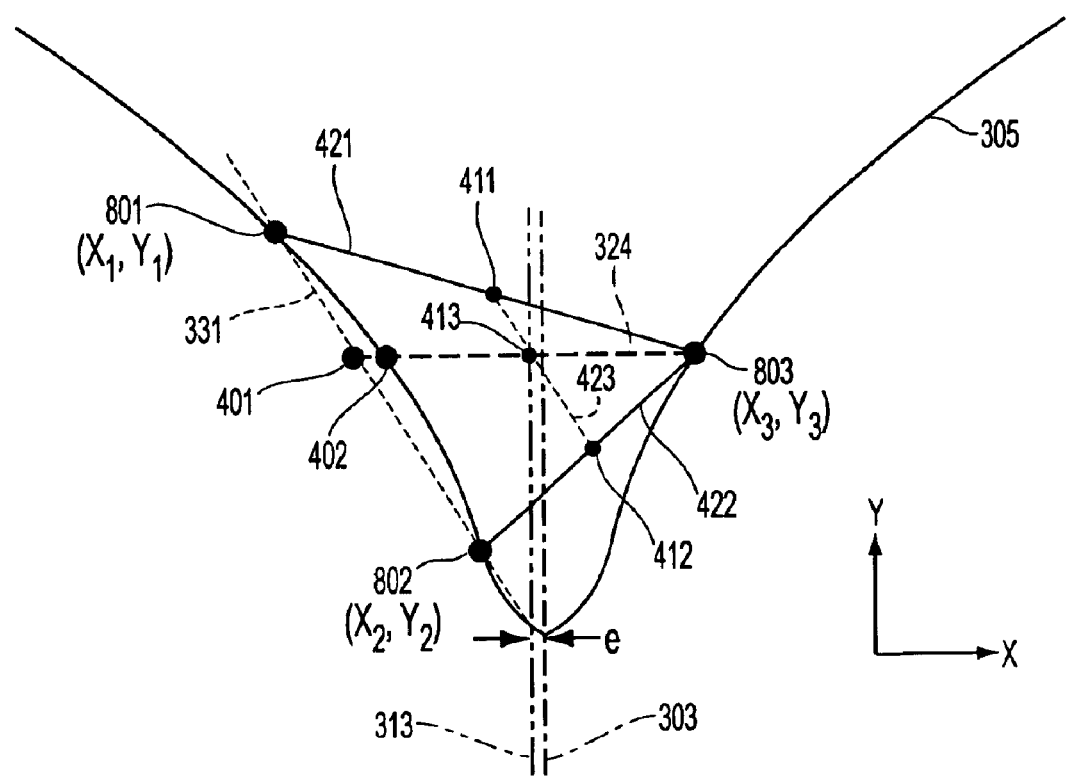
FIG. 19 is a graph showing three discrete correlation function value points in the region near an absolute value of difference correlation function trough extremum (minimum value), illustrating a seventh exemplary embodiment of the systems and methods for estimating displacement according to this invention.

Furthermore, estimates can be further improved by applying the first exemplary embodiment of the systems and methods according to this invention to several sets of correlation function value points, progressively farther from the extremum, and averaging the several resulting peak offsets. Many such variations exist for this and the other exemplary embodiments of the systems and methods according to this invention disclosed herein. It should also be noted that the seventh exemplary embodiment of the systems and methods according to this invention, described below with reference to FIG. 19, provides results which are substantially equivalent to the results of the first exemplary embodiment of the systems and methods according to this invention, when based on the same correlation function value points.

Figure 9:
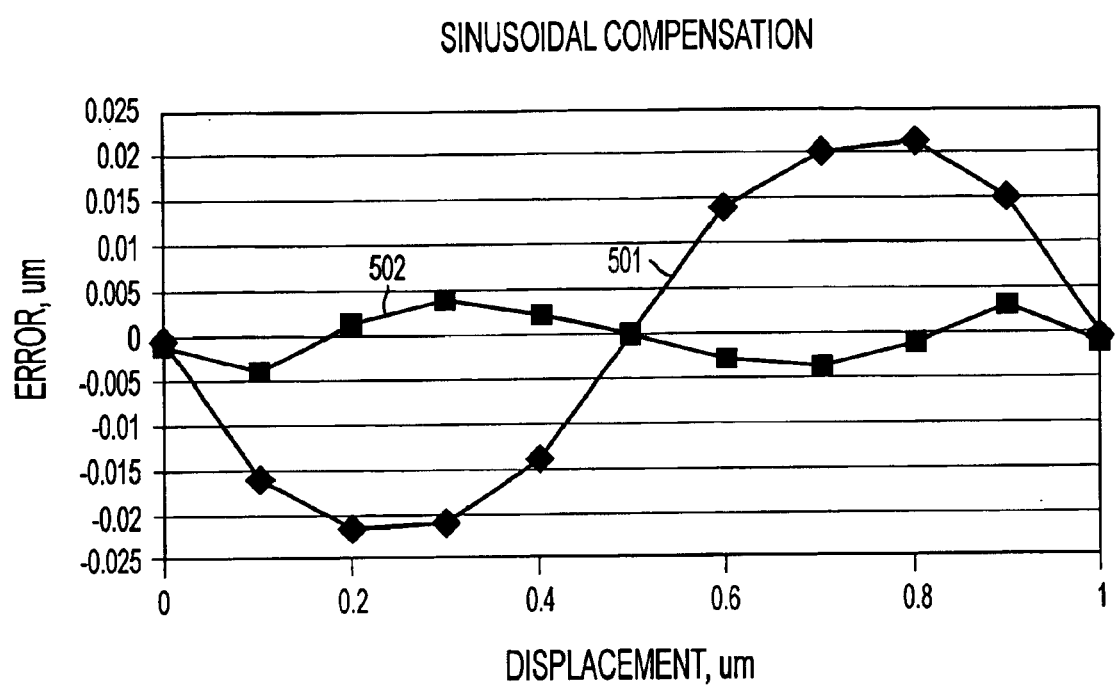
FIG. 9 is a graph illustrating the behavior of errors produced by the first exemplary embodiment of the systems and methods for estimating displacement and the behavior of errors produced by a second exemplary embodiment of the systems and methods for estimating displacement, over a displacement range corresponding to an offset range of one pixel.

FIG. 9 is a graph illustrating the behavior of errors in estimating the peak offset produced by the first exemplary embodiment of the systems and methods according to this invention and a second exemplary embodiment of the systems and methods according to this invention, over a displacement range corresponding to an image offset range of one pixel. As indicated in FIG. 9, the error curve 501 resulting from using the first exemplary embodiment of the systems and methods according to this invention to estimate the true peak offset is periodic. In the second exemplary embodiment of the systems and methods according to this invention, the peak offset estimate resulting from using the first exemplary embodiment of the systems and methods according to this invention is adjusted according to an estimate of the predictable errors in the peak offset estimate, such as the error curve 501.

With reference to FIG. 9, a sine function with the amplitude and period of the error curve 501 is used to determine a compensation value corresponding to the displacement value for each peak offset estimated by the first exemplary embodiment of the systems and methods according to this invention. The compensation value is subtracted from its corresponding peak offset estimate to yield an adjusted peak offset estimate. The error in these adjusted peak offset estimates is shown as the error curve 502. The error curve 502 shows a peak-to-peak error approximately 80% less than the error curve 501.

In various exemplary embodiments that compensate for these predictable errors, the ratio of the peak-to-peak systematic error to the number of correlation function value points in the set used to determine the spatial translation position is not more than about 0.02 parts of the pixel pitch per correlation function value point, when the peak-to-peak systematic error is expressed as a fraction of the pixel pitch. In various other exemplary embodiments that compensate for these predictable errors, this ratio is not more than about 0.01 parts of the pixel pitch per correlation function value point, when the peak-to-peak systematic error is expressed as a fraction of the pixel pitch. In still other various exemplary embodiments that compensate for these predictable errors, this ratio is not more than about 0.005 parts of the pixel pitch per correlation function value point, when the peak-to-peak systematic error is expressed as a fraction of the pixel pitch.

Thus, systematic estimation errors related to the asymmetry of the correlation function value points relative to the true extremum, or peak offset, are further rejected by this second exemplary embodiment of the systems and methods for estimating the extremum, or peak offset, according to this invention. It should be appreciated that, in this example, the compensation has been based on a sinusoidal approximation of the error curve. However, in various other exemplary embodiments, the compensation may be based on a lookup table approximating an error curve, or by a variety of other analytic functions.

It should be appreciated that, if a generic error curve is used, the compensation values derived from the error curve should be normalized or scaled to correspond to a particular product configuration. For example, for products based on speckle-type images, the amplitude of the error depends primarily on the speckle size, the pixel size and the image characteristics, which are fairly constant for a given configuration. The amplitude of the error can be determined by experiment, or approximated by calculation or simulation. Even an approximate compensation according to these principles can provide a substantial portion of the error rejection demonstrated by the compensated error curve 502 shown in FIG. 9.

Figure 10:
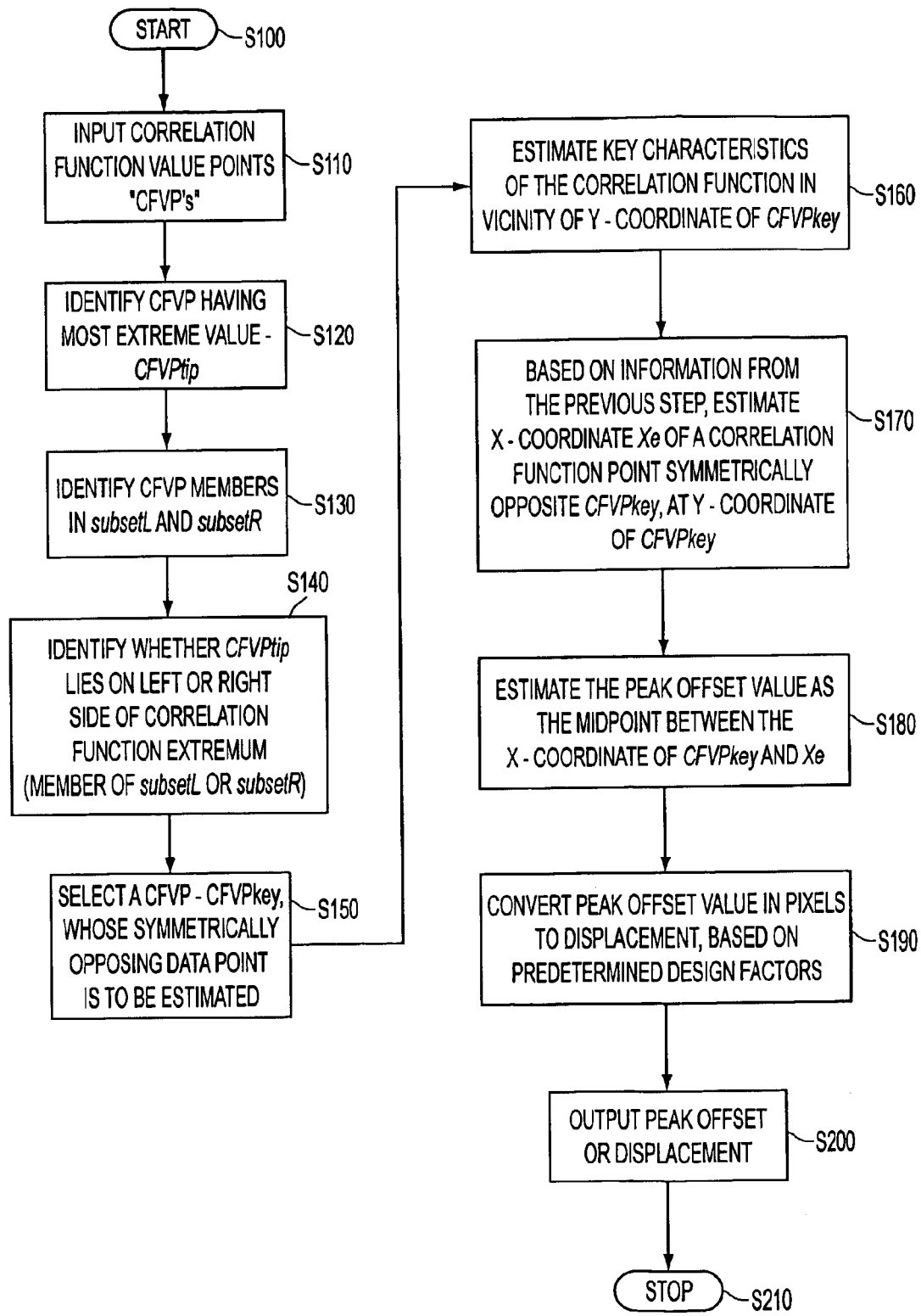
FIG. 10 is flowchart generally outlining several exemplary embodiments of the methods for estimating displacement according to this invention.

FIG. 10 is a flowchart which generally outlines a first exemplary embodiment of a method in accordance with the previously described first exemplary embodiment of systems and methods according to this invention, and also in accordance with several of the other exemplary embodiments of the systems and methods disclosed herein for estimating displacement according to this invention. Beginning in step S100, control proceeds to step S110, where a set of correlation function value points are input, such as those correlation function value points described with reference to FIG. 2 or FIG. 7. These can include, but are not limited to, the correlation function value points in the vicinity of the correlation function peak or trough.

Next, in step S120, the extreme correlation function value point CFVPtip is identified from the input set of correlation function value points. In various exemplary embodiments the extreme correlation function value point CFVPtip is identified, for example, by determining the approximate noise level or average correlation function value based on all the correlation function value points in the set, and then by determining the correlation function value point which has the correlation function value farthest from the noise level or average correlation function value. In FIG. 7, the approximate noise level or average correlation function value is exemplified by the value indicated by the line 306. The extreme correlation function value point CFVPtip is exemplified by the correlation function value point 204 in FIG. 2, or the correlation function value point 304 in FIG. 7.

Then, in step S130, a pair of correlation function value point subsets, subsetL and subsetR, are identified from the input set of correlation function value points. In various exemplary embodiments, the correlation function value point subset subsetL comprises a limited subset of the input correlation function value points with offsets, or x-coordinate values, to the left of CFVPtip. In various exemplary embodiments, the correlation function value point subset subsetR, comprises a limited subset of the input correlation function value points with offsets, or x-coordinate values, to the right of CFVPtip. In various exemplary embodiments, the members of each limited subset may be identified by selecting a predetermined number of correlation function value points adjacent to CFVPtip on the appropriate side.

Alternatively, in various exemplary embodiments, the members of each limited subset may be identified by selecting, on the appropriate side of CFVPtip, the correlation function value points with correlation values in a predetermined normalized range between the value of CFVPtip and the previously discussed approximate noise level or average correlation function value. A correlation function value point in subsetL is exemplified by the correlation function value point 801 in FIG. 8, and a correlation function value point in subsetR is exemplified by the correlation function value point 803 in FIG. 8. Control then continues to step S140.

In step S140, a determination is made whether CFVPtip lies to the left side or to the right side of the extremum of the true correlation function, by any of various known or later-developed methods. In one exemplary embodiment, with reference to FIG. 8, the correlation function value point 802 is CFVPtip. In FIG. 8, because the correlation function value points are offset in equal increments P, if the correlation function value point 801 that lies to the left of the correlation function value point 802 has a correlation value greater than correlation function value point 803 that lies to the right of the correlation function value point 802, then the correlation function value point 802 lies to the left of the extremum, otherwise the correlation function value point 802 lies to the right of the extremum. This method can generally be used to determine the relative locations of the extremum and the CFVPtip point in step S140.

Determining the relative locations of the extremum and the CFVPtip point in step 140 is particularly useful if the peak offset or displacement is estimated based on the slope between CFVPtip and an adjacent correlation function value point. This is the case for the first and second exemplary embodiments of the systems and methods according to this invention, and for many of the other exemplary embodiments of the systems and methods according to this invention disclosed herein. In such cases, if CFVPtip and the adjacent correlation function value point used to determine the slope do not lie on the same side of the extremum, the determined slope cuts across from one side of the extremum to the other, and is therefore not a useful approximation of the slope of the true continuous correlation function in the vicinity of CFVPtip. It should be noted that, in some exemplary embodiments of the systems and methods according to this invention, CFVPtip is intentionally excluded from the set of correlation function value points used for estimating the peak offset or displacement. In such cases, step S140 may be omitted.

In steps S110–S140, information is determined which identifies an arrangement of correlation function value points analogous or equivalent to the correlation function value points shown in FIGS. 8, 11, 12, 14, and 16, for example. Thus, any of the exemplary embodiments of the systems and methods according to this invention, disclosed herein for estimating the peak offset or displacement, and described in association with those figures, may be used in place of steps S110–S140.

Next, in step S150, a correlation function value point CFVPkey is selected. In later steps, a correlation function value point will be estimated which is intended to be symmetrically located about the extremum, or peak offset, of the true continuous correlation function relative to the correlation function value point CFVPkey. In various exemplary embodiments, the correlation function value point CFVPkey is selected from the subset, subsetL or subsetR, with the fewest members, or as otherwise indicated or suggested in the various exemplary embodiments of the systems and methods according to this invention described herein. In FIG. 8, the correlation function value point CFVPkey is exemplified by the correlation function value point 803. In the first and second exemplary embodiments of the systems and methods according to this invention, and the other exemplary embodiments of the systems and methods according to this invention described herein, it should be noted that it is desirable, but not necessary, that the correlation function value, or y-coordinate value, of the correlation function value point CFVPkey lies between two correlation function values, or y-coordinate values, of two members of the subset of correlation value points lying on the opposite side of the extremum.

Then, in step S160, the true continuous correlation function is characterized, or estimated, over a portion of the true continuous correlation function which is generally symmetrically located about the extremum, or peak offset, of the true continuous correlation function relative to the correlation function value point CFVPkey. It is only necessary to characterize, or estimate, the true continuous correlation function to the extent required to estimate a correlation function value point that is symmetrically located about the extremum, or peak offset, of the true continuous correlation function relative to the correlation function value point CFVPkey. Various exemplary embodiments of the systems and methods according to this invention disclosed herein for estimating the peak offset or displacement disclose techniques usable to characterize, or estimate, the desired portion of the true continuous correlation function. For example, in FIG. 8 and the associated first and second exemplary embodiments of the systems and methods according to this invention, the characterization, or estimate, of the desired portion of the true continuous correlation function 305 is exemplified by the characteristics of the line 331.

Next, in step S170, the x-coordinate value $x_e$ of a point symmetrically located about the extremum, or peak offset, of the true continuous correlation function relative to the correlation function value point CFVPkey is estimated. As discussed elsewhere herein, all of the exemplary embodiments of the systems and methods according to this invention disclosed herein for estimating the peak offset or displacement disclose techniques usable for estimating $x_e$. For example, in FIG. 8, as previously mentioned, the correlation function value point CFVPkey is exemplified by the correlation function value point 803. The correlation function value point 803 has a y-coordinate value $y_3$. Therefore, in FIG. 8, and the associated first and second exemplary embodiments of the systems and methods according to this invention, $x_e$ is determined from the x-coordinate value of the point symmetrically located about the extremum, or peak offset, of the true continuous correlation function relative to the correlation function value point CFVPkey, that is, the estimated point 401 lying on the line 331 at the y-coordinate value $y_3$. Control then continues to step S180.

In step S180, the peak offset value is estimated as the offset, or x-coordinate value, of the symmetry point, or mid-point, between the previously determined x-coordinate value of the correlation function value point CFVPkey and $x_e$. With reference to FIG. 8, this peak offset value is exemplified by the x-coordinate value indicated by the line 313, at:

$$x_{peak\ offset}=(x_e+x_3)/2 \qquad (6)$$

It should be noted that, in steps S170 and S180, the peak offset is estimated based on the mid-point between two symmetric points. However, as noted with reference to the first and second exemplary embodiments of the systems and methods according to this invention, substantially equivalent results can be obtained, for example, by locating the x-coordinate value of the intersection of two symmetric lines located through symmetric correlation function value points. Therefore, the exemplary embodiments of the systems and methods disclosed herein for determining the peak offset value based on symmetric correlation function value points are to be regarded as exemplary embodiments only, with the recognition that given the characteristics, or estimate, of a portion of the true correlation function which is generally symmetrically located about the extremum, or peak offset, of the true continuous correlation function relative to a correlation function value point analogous to CFVPkey, the x-coordinate value of the associated line of symmetry, that is, the peak offset value, can be determined by a wide variety of geometric or mathematical methods.

Then, in step S190, the peak offset value is converted to a displacement according to predetermined design factors. Exemplary predetermined design factors and the associated exemplary conversion have been previously described with reference to FIGS. 2 and 7. It should be appreciated that when the offset between the first and second images used to determine the correlation function value points is caused by the displacement of a surface which determines the first and second images, then any offset value in terms of units of the pixel pitch P, may converted to a displacement value in terms of conventional measurement units.

In recognition of this fact, the x-axis values shown in FIGS. 2 and 7 are labeled with both terms. For example, with reference to FIGS. 1, 2 and 7, if the effective center-to-center spacing, or pixel pitch P, of the image elements 162 in the direction corresponding to the measurement axis 110 is 10 μm, and the optical system of the readhead 126 magnifies the surface displacement by 10×, then a 1 μm displacement of the illuminated portion of the optically diffusing, or optically rough, surface 104 will be magnified into a 10 μm displacement, that is, a 1 P displacement, of the speckle pattern on the image elements 162.

Therefore, in various exemplary embodiments of the systems and methods according to this invention, the x-coordinate values used in any step are alternatively either in terms of the pixel pitch P, or in terms of displacement units, according to the appropriate conversion. Furthermore, in various exemplary embodiments of the systems and methods according to this invention, step S190 is omitted, or performed in a different sequence relative to the other steps of the embodiment.

Next, in step S200, the previously determined peak offset or displacement, is output with sub-pixel resolution. Finally, in step S210, the control routine ends.

It should be noted that, in steps S150–S210, a peak offset or peak displacement is determined based on an arrangement of correlation function value points analogous or equivalent to the correlation function value points shown in FIGS. 8, 11, 12, 14, and 16, for example. Thus, any of the exemplary embodiments of the systems and methods according to this invention, disclosed herein for estimating the peak offset or displacement and described in association with those figures, may be used in place of steps S150–S210.

Figure 11:
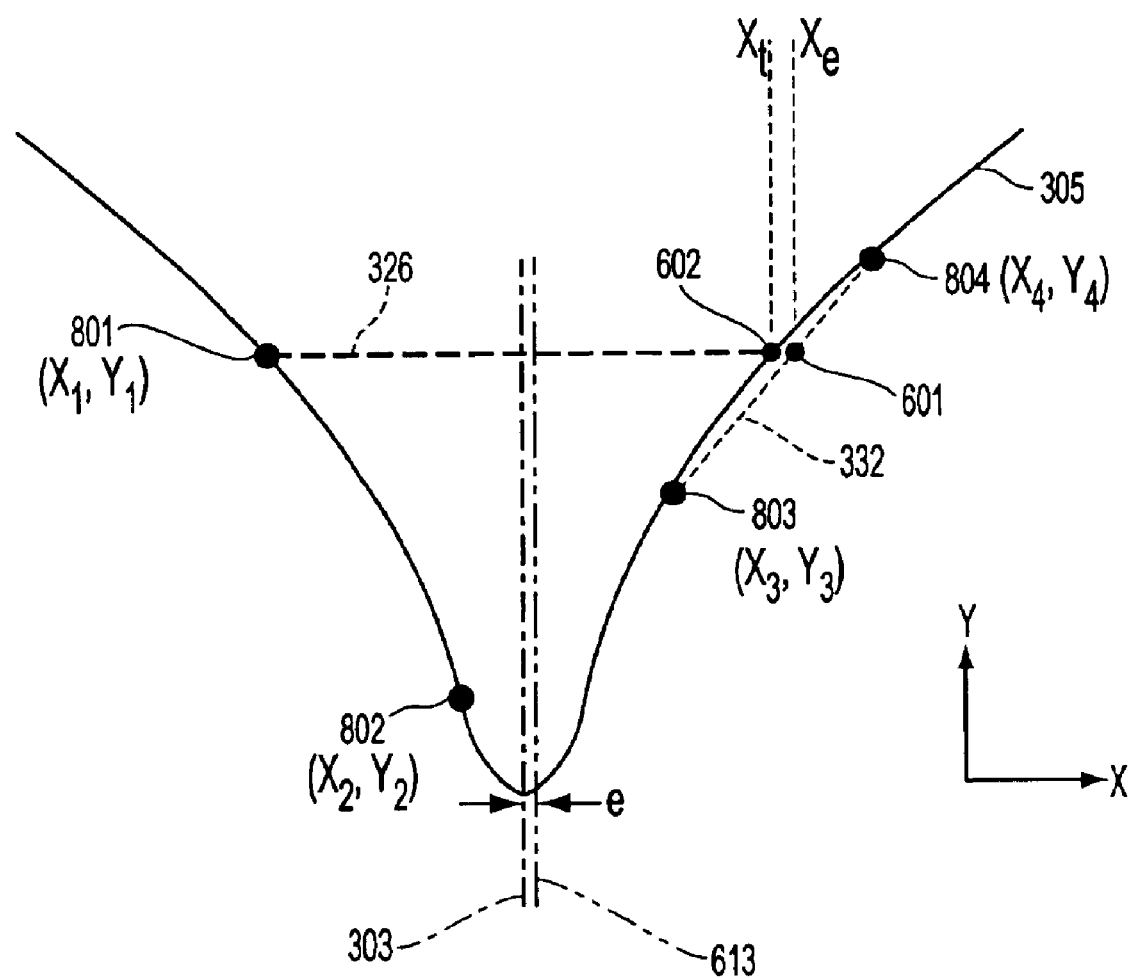
FIG. 11 is a graph showing four discrete correlation function value points in the region near an absolute value of difference correlation function trough extremum, illustrating a third exemplary embodiment of the systems and methods for estimating displacement according to this invention.

FIG. 11 shows a third exemplary embodiment of the systems and methods for estimating the peak offset or displacement according to this invention. As shown in FIG. 11, the correlation function value points 801, 802, 803 and 804 are spaced apart by an offset increment equal to P, as previously described. The correlation function value points 801, 802, 803 and 04 are determined using the absolute value of difference correlation function and presumably lie on the true continuous correlation function 305. This third exemplary embodiment of the systems and methods according to this invention is similar to the first exemplary embodiment of the systems and methods according to this invention, except that the extreme correlation function value point is identified and excluded from the set of correlation function value points used to determine the peak offset value.

In FIG. 11, the correlation function value point 802, the minimum correlation function value point in FIG. 11, is so excluded. The inventors have determined that excluding the extreme correlation function value point further reduces estimation errors in comparison to the first exemplary embodiment of the systems and methods according to this invention. A superior estimate of the x-coordinate value of the peak offset can be derived from correlation function value points located where the correlation function can be well-approximated by the sparse correlation function value points. This is true because the shape of the correlation function near the extremum exhibits a high curvature and is not well-approximated by sparse correlation function value points or simple lower-order functions.

As shown in FIG. 11, in this third exemplary embodiment of the systems and methods according to this invention, a correlation function value point lying on a first side of the correlation function extremum, such as the correlation function value point 801, having an x-coordinate value $x_1$ and a y-coordinate value $y_1$, is identified. In the exemplary embodiment shown in FIG. 11, the correlation function value point 801 corresponds to the correlation function value point CFVPkey, of FIG. 10. In addition, two points lying on the opposite side of the correlation function extremum from correlation function value point 801, such as the correlation function value points 803 and 804, are identified. A unique line 332 passing through the correlation function value points 803 and 804, and having a slope $S_{34}$, is constructed. The characteristics of the line 332 provide an estimate of the true correlation function in the vicinity of the y-coordinate value $y_1$, on the opposite side of the correlation function extremum from the correlation function value point 801.

Next, an estimated point 601 on the line 332 is identified which has a y-coordinate value equal to the y-coordinate value $y_1$, as indicated by the line 326. The x-coordinate value of this estimated point 601, $x_e$, is an estimate of the true x-coordinate value $x_t$ of a point 602 lying on the curve of the true continuous correlation function 305, and symmetrically located about the extremum, or peak offset, of the true continuous correlation function 305 relative to the correlation function value point 801. Given the x-coordinate values $x_e$ and $x_1$, the peak offset can be estimated as the x-coordinate value midway between $x_e$ and $x_1$:

$$x_{peak\ offset}=(x_e+x_1)/2 \qquad (7)$$

As shown in FIG. 11, the estimated peak offset, i.e., the x-coordinate value of the line 613, approximates the true peak offset, i.e., the x-coordinate value of the line 303. The error e is approximately $(x_e-x_t)/2$.

The inventors have observed approximately 75% lower periodic sub-pixel errors when using this third exemplary embodiment of the systems and methods according to this invention, compared to using the first exemplary embodiment of the systems and methods according to this invention, when using the same images and a similar number of correlation function value points. Thus, systematic estimation errors related to the asymmetry of the correlation function value points about the peak offset value are further rejected by this third exemplary embodiment of the systems and methods according to this invention.

Figure 20:
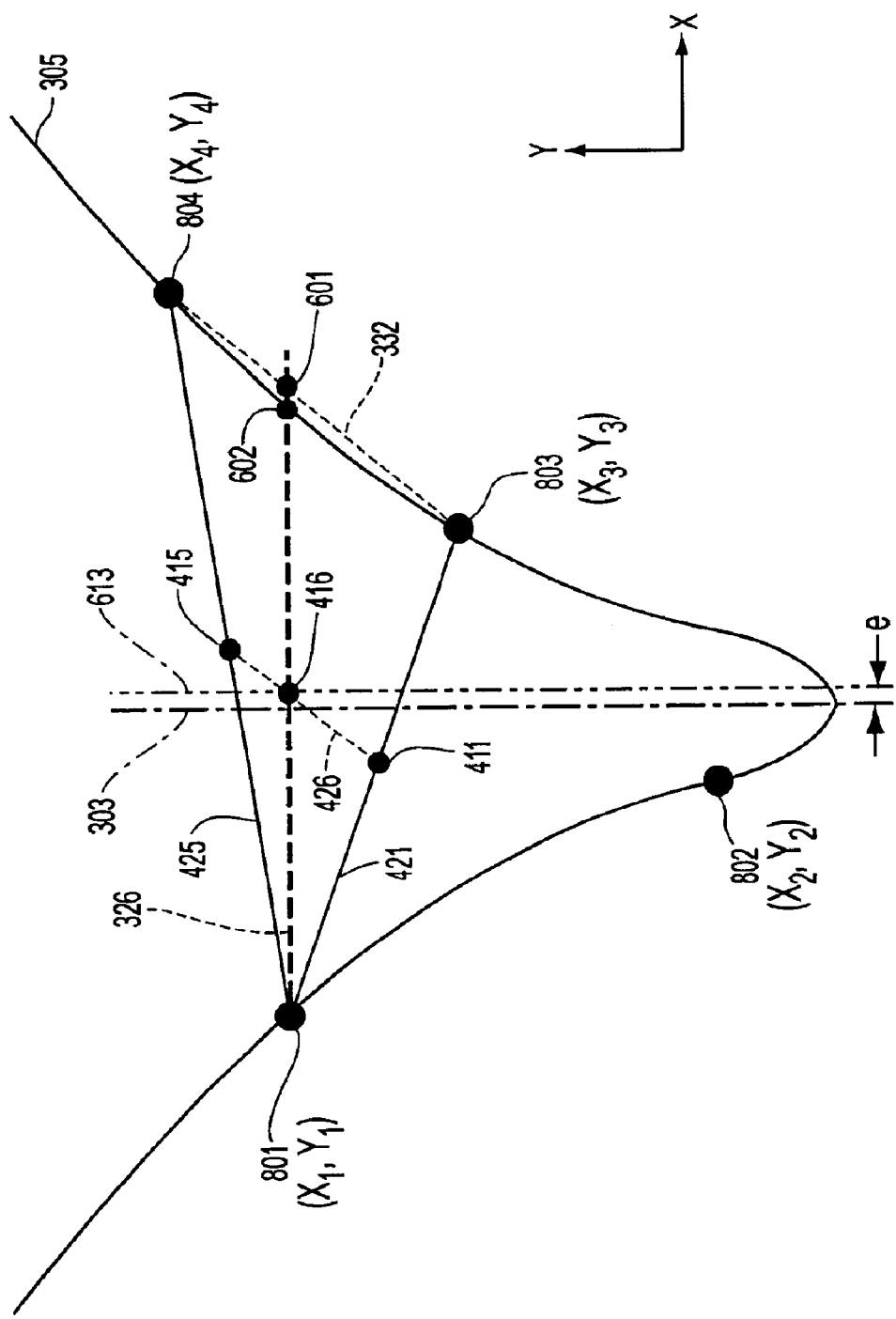
FIG. 20 is a graph showing four discrete correlation function value points in the region near an absolute value of difference correlation function trough extremum, illustrating an eighth exemplary embodiment of the systems and methods for estimating displacement according to this invention.

It should be appreciated that, in various exemplary embodiments, one or more additional correlation function value points with correlation function values within a prescribed range of the extreme correlation function value point may also be identified and excluded from the set of correlation function value points used in the third exemplary embodiment of the systems and methods according to this invention. It should also be noted that the eighth exemplary embodiment of the systems and methods according to this invention, described below with reference to FIG. 20, provides results which are substantially equivalent to the results of the third exemplary embodiment of the systems and methods according to this invention, when based on the same correlation function value points.

Figure 12:
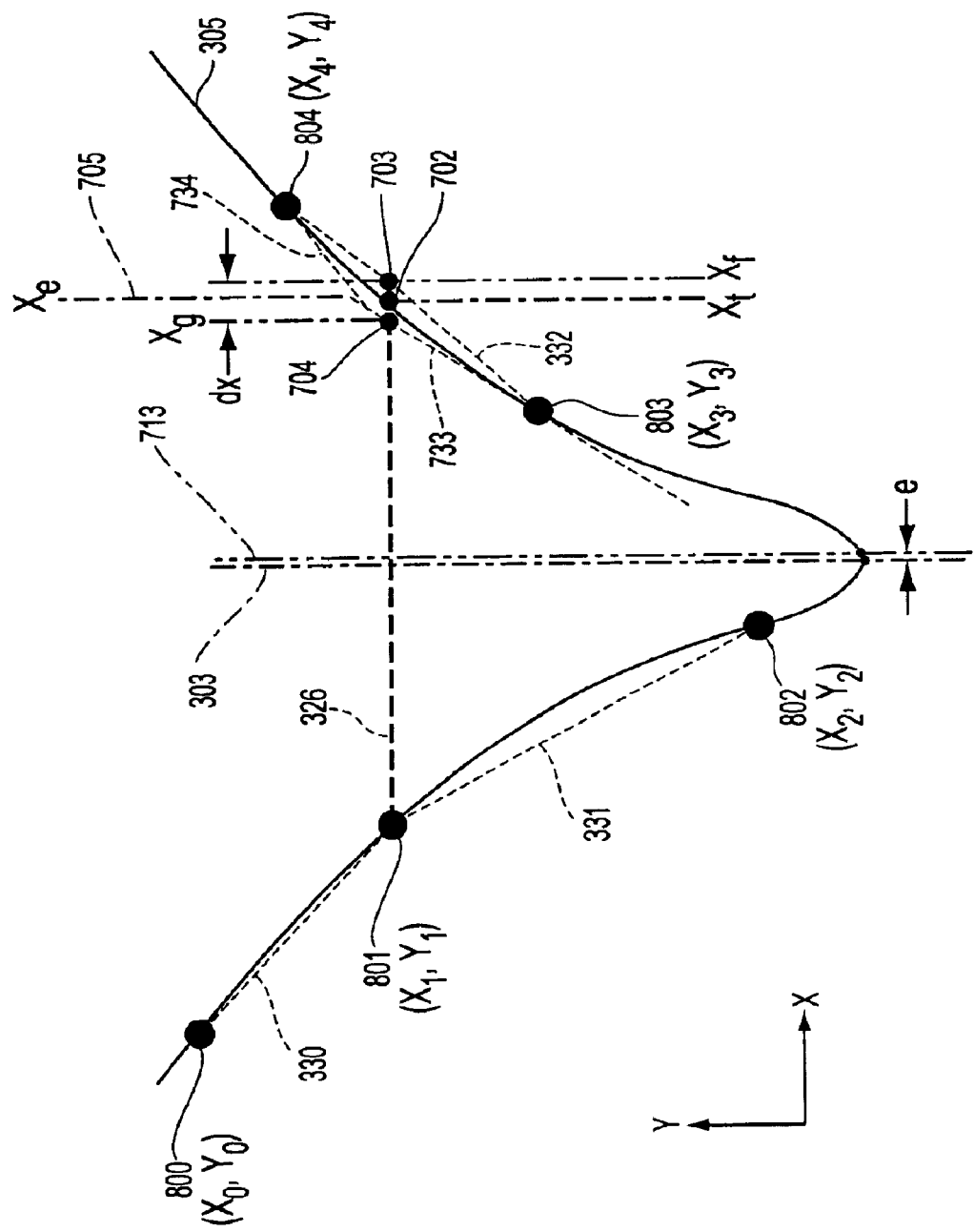
FIG. 12 is a graph showing five discrete correlation function value points in the region near an absolute value of difference correlation function trough extremum, illustrating a fourth exemplary embodiment of the systems and methods for estimating displacement according to this invention.

FIG. 12 shows a fourth exemplary embodiment of the systems and methods for estimating the peak offset or displacement according to this invention. As shown in FIG. 12, the correlation function value points 800, 801, 802, 803 and 804 are spaced apart by an offset increment equal to P, as previously described. The correlation function value points 800, 801, 802, 803 and 804 are determined using the absolute value of difference correlation function and presumably lie on the true continuous correlation function 305. The previously described convention for representing the slope connecting two correlation function value points, represented by Eq. (4), is used where applicable in the following description. That is, unless otherwise indicated, a slope $S_{i\ i+1}$ is determined according to Eq. (4), where the last digit of the labels 800, 801, 802, 803 or 804, which identify the correlation function value points in the example of FIG. 12, correspond to the subscripts i and i+1 used in Eq. (4).

As shown in FIG. 12, in this fourth exemplary embodiment of the systems and methods according to this invention, a correlation function value point lying on a first side of the correlation function extremum, such as correlation function value point 801, having an x-coordinate value $x_1$ and a y-coordinate value $y_1$, is identified. In the exemplary embodiment shown in FIG. 12, the correlation function value point 801 corresponds to the correlation function value point CFVPkey of FIG. 10, and is selected in the exemplary embodiment shown in FIG. 12 by selecting the correlation function value point which is adjacent to the extreme correlation function value point and on the same side of the correlation function extremum as the extreme correlation function value point. The following exemplary steps of this fourth exemplary embodiment of the systems and methods according to this invention disclose one exemplary technique usable to estimate the characteristics of a portion of the true correlation function 305 which is generally symmetrically located on the opposite side of the correlation function extremum from a correlation function value point, such as the correlation function value point 801 shown in FIG. 12.

Next, two points lying on the opposite side of the correlation function extremum from the correlation function value point 801, such as the correlation function value points 803 and 804, are identified. A unique line 332, passing through the correlation function value points 803 and 804, and having a slope $S_{34}$, is constructed.

In this fourth exemplary embodiment of the systems and methods according to this invention, additional information indicative of the slope of the correlation function on one side of the correlation function extremum in the vicinity of a y-coordinate value, is used to better estimate, or characterize, the true continuous correlation function 305 in a vicinity approximately symmetrically located at a similar y-coordinate value on the opposite side of the correlation function extremum. For example, the slope $S_{01}$ of the line 330 which passes through the correlation function value points 800 and 801, and the slope $S_{12}$ of the line 331 which passes through the correlation function value points 801 and 802, can provide information which improves the estimate of the true continuous correlation function 305 between the correlation function value points 803 and 804.

In this fourth exemplary embodiment of the systems and methods according to this invention, similarly to the third exemplary embodiment of the systems and methods according to this invention, a point 703 on the line 332 is identified which has a y-coordinate value equal to the y-coordinate value $y_1$ of the correlation function value point 801, as indicated by the line 326. The value of the x-coordinate of the point 703 is $x_f$. Further, empirically-determined correction factors k1 and k2 are introduced. Then, as shown in FIG. 12, a new line 734 passing through the correlation function value point 804 is defined. This new line 734 has a slope $S_A$ of:

$$S_A = S_{34}(1-k_1) - k_1 S_{01} \qquad (8)$$

Also, a new line 733 passing through the correlation function value point 803 is defined. This new line 733 has a slope $S_B$ of:

$$S_B = S_{34}(1-k_2) - k_2 S_{12} \qquad (9)$$

When the empirically-determined correction factors k1 and k2 are properly chosen, the lines 734 and 733 generally provide a better approximation of the true continuous correlation function 305 than the line 332 used by the third exemplary embodiment of the systems and methods according to this invention. Typically, the two lines 734 and 733 will intersect at a point having a y-coordinate value between the y-coordinate values of the correlation function value points 803 and 804.

Next, a point on the line 734, or on the line 733 is identified. This new point has a y-coordinate value equal to the y-coordinate value $y_1$ of the correlation function value point 801, as indicated by the line 326. In various exemplary embodiments, if the of the y-coordinate value $y_1$ lies below the y-coordinate value of the intersection point of the lines 734 and 733, then a point on the line 733 is chosen, as indicated by the point 704 having the x-coordinate value $x_g$ in the example of FIG. 12. If the value of the y-coordinate $y_1$ lies above the value of the y-coordinate of the intersection of lines 734 and 733, then a point analogous to point 704, on the line 734, is chosen. In either case, the x-coordinate value of the chosen point determines the value $x_g$ in the following steps.

Another empirically-determined correction factor k3, is then introduced and used to determine an adjusted x-coordinate value $x_e$. The adjusted x-coordinate value $x_e$ is an adjusted estimate of the true x-coordinate value $x_t$ of a point 702 lying on the curve of the true continuous correlation function 305, and symmetrically located about the extremum, or peak offset, of the true continuous correlation function 305 relative to the correlation function value point 801. The x-coordinate value $x_e$ is indicated by the line 705 in the example of FIG. 12. $x_e$ is:

$$x_e = x_f - k3(x_f - x_g) \qquad (10)$$

It should be noted that if the two lines 733 and 734 do not intersect at a point having a y-coordinate value between the y-coordinate values of the correlation function value points 803 and 804, then in various exemplary embodiments no adjusted estimate is made, and the value of the x-coordinate $x_e$ is assigned the value $x_e = x_f$.

Next, given the values of the x-coordinates $x_e$ and $x_1$, the peak offset can be estimated as the x-coordinate value midway between $x_e$ and $x_1$:

$$x_{peak\ offset} = (x_e + x_1)/2 \qquad (11)$$

As shown in FIG. 12, the estimated peak offset, i.e., the x-coordinate value of the line 713, closely approximates the true peak offset, i.e., the x-coordinate value of the line 303. The error e is approximately equal to $(x_e - x_t)/2$.

The constants k1, k2 and k3 should be adjusted experimentally to provide the best results for a given image type or product configuration. When evaluated with speckle image data, the inventors have found that the value of 0.4 for all 3 constants gives the best results for typical absolute value of difference correlation function curves, such as that shown in FIG. 7.

The inventors have observed approximately 60–75% lower errors when using this fourth exemplary embodiment of the systems and methods according to this invention, compared to using the third exemplary embodiment of the systems and methods according to this invention, when using the same images and a similar number of correlation function value points. Thus, systematic estimation errors related to the asymmetry of the correlation function value points about the extremum, or peak offset value, are further rejected by the this fourth exemplary embodiment of the systems and methods according to this invention. It should be appreciated that in various exemplary embodiments, one or more additional correlation function value points with correlation function values within a prescribed range of the correlation function value of the extreme correlation function value point may also be identified and excluded from the set of correlation function value points used in the fourth exemplary embodiment of the systems and methods according to this invention,.

Table 1 compares the error results obtained using a conventional method and the first, third and fourth exemplary embodiments of the systems and methods for estimating the peak offset or displacement according to this invention, when these embodiments of the systems and methods are applied to the same speckle image data and use approximately the same number of correlation function value points.

lation function 305. The previously described convention for representing the slope connecting two correlation function value points is used where applicable in the following description. That is, unless otherwise indicated, a slope $S_{i\,i+1}$ is determined according to Eq. (4), where the last digit of the labels 800, 801, 802, 803 or 804, which identify the correlation function value points in the example of FIGS. 14 and 15, correspond to the subscripts i and i+1 used in Eq. (4).

In this fifth exemplary embodiment of the systems and methods according to this invention, additional information indicative of the slope of the correlation function on one side of the correlation function extremum, in the vicinity of a y-coordinate value, is used to better estimate, or characterize, the true continuous correlation function 305 in a vicinity approximately symmetrically located at a similar y-coordinate value on the opposite side of the correlation function extremum. For example, the slope $S_{01}$ of the line 330 which passes through correlation function value points 800 and 801, and the slope $S_{12}$ of the line 331 which passes through the correlation function value points 801 and 802, can add information which improves the estimate of the true continuous correlation function 305 between the correlation function value points 803 and 804. However, this fifth exemplary embodiment of the systems and methods according to this invention does not require the empirical constants used in the fourth exemplary embodiment of the systems and methods according to this invention.

Figures 14, 15:
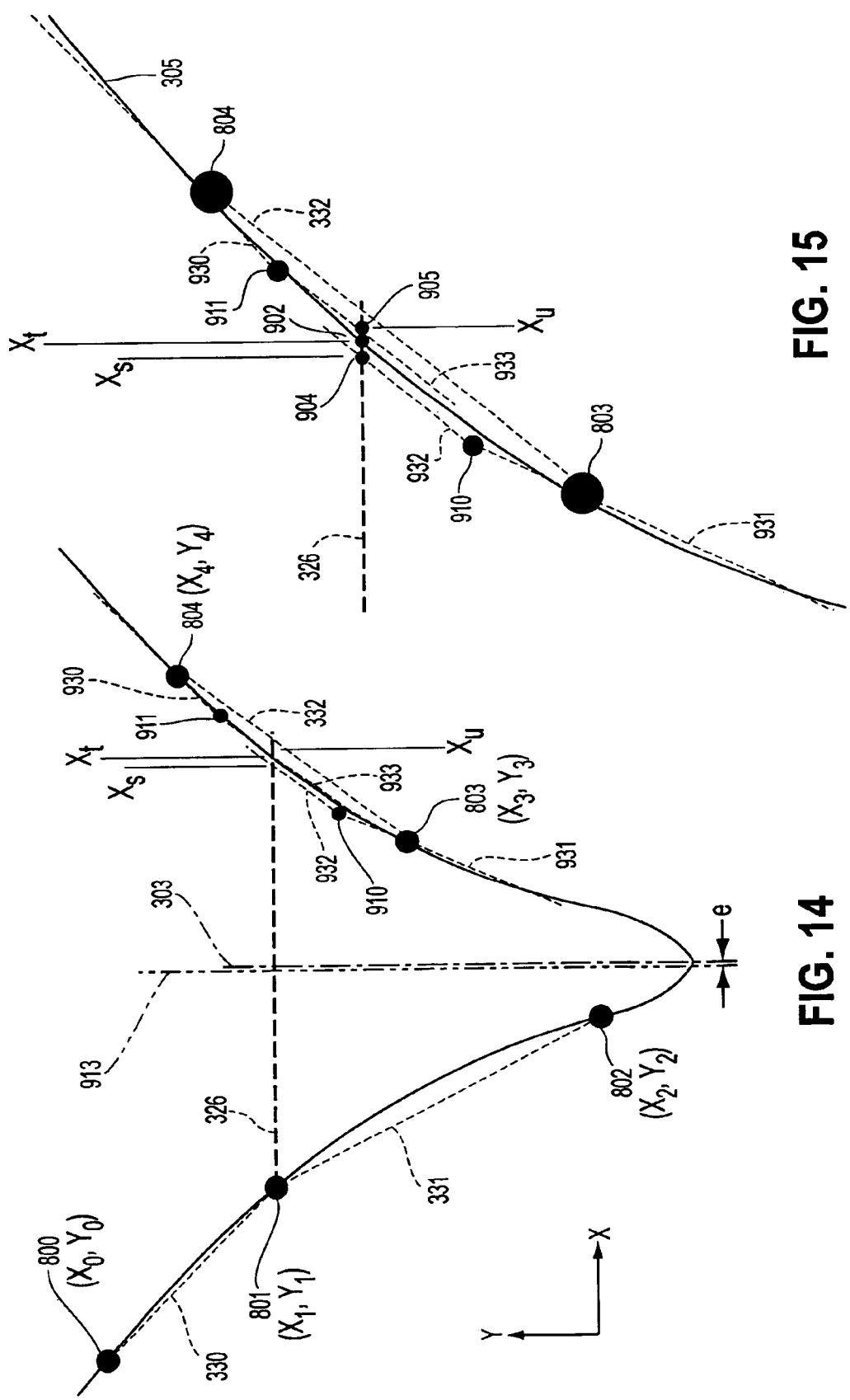
FIG. 14 is a graph showing five discrete correlation function value points in the region near an absolute value of difference correlation function trough extremum, illustrating a fifth exemplary embodiment of the systems and methods for estimating displacement according to this invention.
FIG. 15 shows in greater detail of a portion of the graph of FIG. 14.

As shown in FIG. 14, in this fifth exemplary embodiment of the systems and methods according to this invention, a

TABLE 1

| Pinhole size corresponding to speckle image mm | Peak or trough width at approx. $(y_{max} - y_{min})/2$ pixels | Periodic errors, nm peak—peak | | | |
|---|---|---|---|---|---|
| | | Conventional Method (Prior Art) | First Method | Third Method | Fourth Method (k1 = k2 = k3 = 0.4) |
| 1.5 | 4.5 | 60 | 43 | 10 | 3.0 |
| 2.0 | 2.5 | 63 | 49 | 12 | 3.6 |
| 3.0 | 2 | 87 | 71 | 20 | 6.1 |

Figure 13:
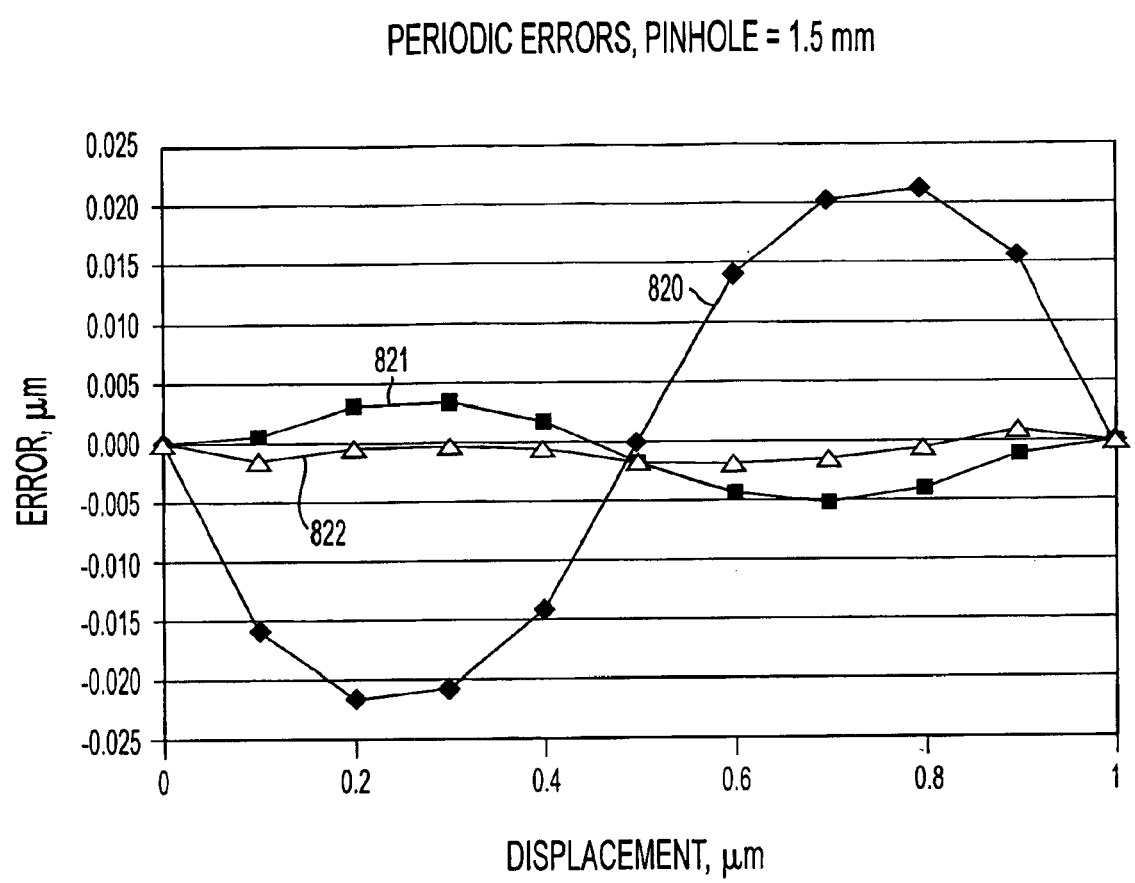
FIG. 13 is a graph illustrating the behavior of errors produced by the first, third and fourth exemplary embodiments of the systems and methods for estimating displacement according to this invention, over a displacement range corresponding to an offset range of one pixel.

FIG. 13 shows typical error curves over a displacement range corresponding to one unit of the pixel pitch P, for the first, third and fourth exemplary embodiments of the systems and methods for estimating the peak offset or displacement according to this invention. The curves shown in FIG. 13 correspond to the top line of the peak-to-peak errors shown in Table 1. The line 820 shows the errors resulting from using the first exemplary embodiment of the systems and methods according to this invention. Table 1 shows that even these errors are significantly less than the error resulting from using the prior art method. The line 821 shows the error curve resulting from using the third exemplary embodiment of the systems and methods according to this invention. The line 822 shows the error curve resulting from using the fourth exemplary embodiment of the systems and methods according to this invention.

FIGS. 14 and 15 show a fifth exemplary embodiment of the systems and methods for estimating the peak offset or displacement according to this invention. As shown in FIG. 12, the correlation function value points 800, 801, 802, 803 and 804 are spaced apart in the x-direction by an offset increment equal to P, as previously described. The correlation function value points 800, 801, 802, 803 and 804 are determined using the absolute value of difference correlation function and presumably lie on the true continuous correcorrelation function value point lying on a first side of the correlation function extremum, such as the correlation function value point 801, having an x-coordinate value $x_1$ and a y-coordinate value $y_1$, is identified. In the exemplary embodiment shown in FIG. 14, the correlation function value point 801 corresponds to the correlation function value point CFVPkey of FIG. 10, and is selected in the exemplary embodiment shown in FIG. 14, by selecting the correlation function value point which is adjacent to the extreme correlation function value point and on the same side of the correlation function extremum as the extreme correlation function value point.

The following exemplary steps of this fifth exemplary embodiment of the systems and methods according to this invention disclose one exemplary technique usable to estimate the characteristics of a portion of the true correlation function 305 which is generally symmetrically located on the opposite side of the correlation function extremum from a correlation function value point, such as the correlation function value point 801, shown in FIG. 14.

Next, two points lying on the opposite side of the correlation function extremum from the correlation function value point 801, such as the correlation function value points 803 and 804, are identified. A unique line 332, passing through the correlation function value points 803 and 804, and having a slope $S_{34}$, is constructed. Next, as best shown in FIG. 15, a new line 930 is defined, passing through the correlation function value point 804 and having the slope–$S_{01}$. It should be noted that the value of the y-coordinate of the correlation function value point 804 lies within the range of the values of the y-coordinates of the correlation function value points 800 and 801 which are used to determine the slope–$S_{01}$. Therefore, for a true correlation function 305 which is symmetric about the extremum, or peak offset value, the slope–$S_{01}$ is one of the best available estimates of the slope of the true correlation function 305 at the y-coordinate value of the correlation function value point 804.

Next, the point 911 is determined. The point 911 is the point on the line 930 having a y-coordinate value equal to $[y_4-(y_4-y_3)/4]$. Then, a new line 933 is defined that extends from the point 911 and has a slope $S_{34}$. The line 933 is a first approximation of a portion of the true continuous correlation function 305. The characteristics of the line 933 provide an estimate of the true correlation function in the vicinity of the y-coordinate value $y_1$, on the opposite side of the correlation function extremum from the correlation function value point 801. Then, as best seen in FIG. 15, a point 905 on the line 933 is identified which has a y-coordinate value equal to the y-coordinate value $y_1$ of the correlation function value point 801, as indicated by the line 326.

It should be noted that the value of the y-coordinate $y_1$ of the correlation function value point 801 lies within the range of the values of the y-coordinates of the correlation function value points 803 and 804, which are used to determine the slope $S_{34}$. Therefore, for a true correlation function 305 which is symmetric about the extremum, or peak offset value, the slope $S_{34}$ of the line 933 is one of the best available estimates of the slope of the true correlation function 305 at the y-coordinate value $y_1$ of the point 905. The x-coordinate value of the point 905, $x_u$, is a first estimate of the true x-coordinate value $x_t$ of a point 902 lying on the curve of the true continuous correlation function 305, and symmetrically located about the extremum, or peak offset of the true continuous correlation function 305 relative to the correlation function value point 801.

Alternatively in this fifth exemplary embodiment of the systems and methods according to this invention, a new line 931 is defined, passing through the correlation function value point 803 and having slope–$S_{12}$. It should be noted that the value of the y-coordinate of the correlation function value point 803 lies within the range of the values of the y-coordinates of the correlation function value points 801 and 802 which are used to determine the slope–$S_{12}$. Therefore, for a true correlation function 305 which is symmetric about the extremum, or peak offset value, the slope–$S_{12}$ is one of the best available estimates of the slope of the true correlation function 305 at the y-coordinate value of the correlation function value point 803. Next, the point 910 is determined. The point 910 is the point on the line 931 having a y-coordinate value equal to $[y_3+(y_4-y_3)/4]$.

Next, a new line 932 is defined that extends from the point 910 and has the slope $S_{34}$. The line 932 is a second, or alternative, approximation of a portion of the true continuous correlation function 305. The characteristics of the line 932 provide an alternative estimate of the true correlation function in the vicinity of the y-coordinate value $y_1$, on the opposite side of the correlation function extremum from the correlation function value point 801. Then, as best seen in FIG. 15, a point 904 on the line 932 is identified which has a y-coordinate value equal to the y-coordinate value $y_1$ of the correlation function value point 801, as indicated by the line 326. The x-coordinate value of the point 904, $x_s$, is a second, or alternative, estimate of the true x-coordinate value $x_t$ of a point 902 lying on the curve of the true continuous correlation function 305, and symmetrically located about the extremum, or peak offset, of the true continuous correlation function 305 relative to the correlation function value point 801.

Then, an x-coordinate value, $x_e$, is determined. In this fifth exemplary embodiment of the systems and methods according to this invention, the x-coordinate value $x_e$ (not shown) is the final estimate of the true x-coordinate value $x_t$ of a point 902 lying on the curve of the true continuous correlation function 305, and symmetrically located about the extremum, or peak offset, of the true continuous correlation function 305 relative to the correlation function value point 801. It should be noted that, as shown in FIGS. 14 and 15, either of the x-coordinate values $x_u$ or $x_s$ provides a good estimate of the true x-coordinate value, $x_t$, of a point 902 lying on the curve of the true continuous correlation function 305. Further, it should be noted that, at the expense of minor additional complexity, averaging the x-coordinate values $x_u$ and $x_s$ will generally provide a superior and more robust estimate of the true x-coordinate value, $x_t$, of a point 902 lying on the curve of the true continuous correlation function 305. Therefore, in various embodiments, $x_e$ is determined as:

$$x_e = x_u; \text{ or} \quad (12a)$$

$$x_e = x_s; \text{ or} \quad (12b)$$

$$x_e = (x_u + x_s)/2. \quad (12c)$$

Next, given the values of the x-coordinates $x_e$ and $x_1$, the peak offset can be estimated as the x-coordinate value midway between $x_e$ and $x_1$:

$$x_{peak\ offset} = (x_e + x_1)/2 \quad (13)$$

As shown in FIG. 14, the estimated peak offset, i.e., the x-coordinate value of the line 913, closely approximates the true peak offset, i.e., the x-coordinate value of the line 303. The error e is approximately $(x_e - x_t)/2$.

Systematic estimation errors related to the asymmetry of the correlation function value points about the extremum, or peak offset value, are substantially rejected by this fifth exemplary embodiment of the systems and methods according to this invention. It should be appreciated that in various embodiments, one or more additional correlation function value points with correlation function values within a prescribed range of the correlation function value of the extreme correlation function value point may also be identified and excluded from the set of correlation function value points used in the fifth exemplary embodiment of the systems and methods according to this invention.

Figure 16:
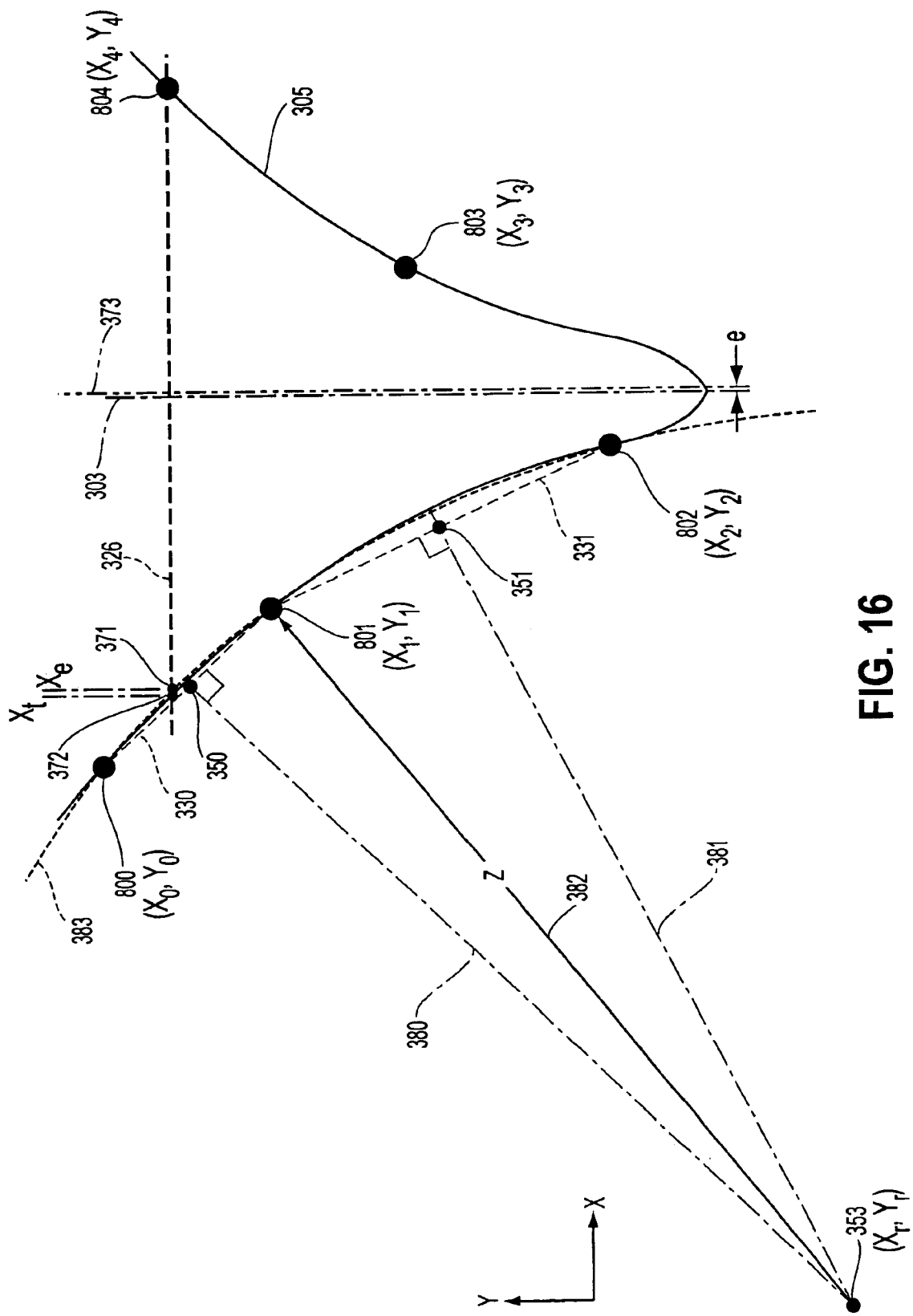
FIG. 16 is a graph showing five discrete correlation function value points in the region near an absolute value of difference correlation function trough extremum, illustrating a sixth exemplary embodiment of the systems and methods for estimating displacement according to this invention.

FIG. 16 is a graph illustrating a sixth exemplary embodiment of the systems and methods for estimating the peak offset or displacement according to this invention. As shown in FIG. 16, the correlation function value points 800, 801, 802, 803 and 804 are spaced apart in the x-direction by an offset increment equal to P, as previously described. The correlation function value points 800, 801, 802, 803 and 804 are determined using the absolute value of difference correlation function and presumably lie on the true continuous correlation function 305. The previously described convention for representing the slope connecting two correlation function value points is used where applicable in the following description. That is, unless otherwise indicated, a slope $S_{i,i+1}$ is determined according to Eq. (4), where the last digit of the labels 800, 801, 802, 803 or 804, which identify the correlation function value points in the example of FIG. 16, correspond to the subscripts i and i+1 used in Eq. (4).

In this sixth exemplary embodiment of the systems and methods according to this invention, a limited number of correlation function value points lying on one side of the correlation function extremum are used to determine a smooth curve which preferably everywhere on the curve has a finite radius of curvature, and which passes through, or closely approximates, all of the correlation function value points used to determine the curve. The characteristics of this curve provide an estimate of a portion of the true continuous correlation function 305.

In the example shown in FIG. 16, the correlation function value points 800, 801 and 802 are used to determine a line of constant curvature 383, that is, a portion of a circle, as an estimate of a portion of the true continuous correlation function 305. FIG. 16 shows that a smooth curve, such as the line 383 which has a finite radius of curvature, provides a superior approximation of a portion of the true continuous correlation function 305, compared to straight-line approximations of a portion of the true continuous correlation function 305, such as the lines 330 and 331, which each have an infinite radius of curvature.

As shown in FIG. 16, a correlation function value point lying on a first side of the correlation function extremum, such as correlation function value point 804, having an x-coordinate value $x_4$ and a y-coordinate value $y_4$, is identified. In the exemplary embodiment shown in FIG. 16, the correlation function value point 804 corresponds to the correlation function value point CFVPkey of FIG. 10, and is selected in the exemplary embodiment shown in FIG. 16, by selecting a correlation function value point lying on the opposite side of the correlation function extremum from the extreme correlation function value point, and which is preferably not adjacent to the extreme correlation function value point.

The following exemplary steps of this sixth exemplary embodiment of the systems and methods according to this invention disclose one exemplary technique usable to estimate the characteristics of a portion of the true correlation function 305, which is generally symmetrically located on the opposite side of the correlation function extremum from a correlation function value point, such as the correlation function value point 804, shown in FIG. 16.

As shown in FIG. 16, three adjacent correlation function value points lying on the opposite side of the correlation function extremum from the correlation function value point 804, such as the correlation function value points 800, 801, and 802, are identified. A unique line segment 330, connecting correlation function value points 800 and 801, and having a slope $S_{01}$, is determined. A point 350, which is the midpoint of the line segment 330, and a line 380, which is the perpendicular bisector of the line segment 330, are determined. The line 380 is completely defined by the slope$-(1/S_{01})$ and the values of the x- and y-coordinates of the point 350, which are in turn completely defined by the coordinates of the correlation function value points 800 and 801.

Further, as shown in FIG. 16, a unique line segment 331, connecting correlation function value points 801 and 802, and having a slope $S_{12}$, is determined. A point 351, which is the midpoint of the line segment 331, and a line 381, which is the perpendicular bisector of the line segment 331, are determined. The line 381 is completely defined by the slope$-(1/S_{12})$ and the values of the x- and y-coordinates of the point 351, which are in turn completely defined by the coordinates of the correlation function value points 801 and 802.

Next, a point 353, which is the intersection point of the perpendicular bisector lines 380 and 381, is determined. The x-coordinate value $x_r$ and the y-coordinate value $y_r$ of the intersection point 353 can be determined by well-known methods, based on the characteristics of the perpendicular bisector lines 380 and 381. It should be noted that, based on the preceding description of the exemplary embodiment shown in FIG. 16, the intersection point 353 coincides with the center point of a circle passing through the correlation function value points 800, 801 and 802, and the constant curvature line 383 represents a portion of such a circle. As exemplified in FIG. 16 by the dimension line 382, the distance from the point 353 to any of the actual correlation function value points used to determine the point 353 equals the radius of curvature Z of the line 383.

Thus, the radius of curvature Z of the circle represented by the constant curvature line 383 can be determined by well-known methods, based on the values of the coordinates of the point 353 and the values of the coordinates of any one of the actual correlation function value points used to determine the point 353. For example, using the x-coordinate value $x_1$ and the y-coordinate value $y_1$ of the correlation function value point 801, and the x-coordinate value $x_r$ and the y-coordinate value $y_r$ of the point 353:

$$Z=((x_1-x_r)^2+(y_1-y_r)^2)^{1/2} \quad (14)$$

More generally, for any point having the general coordinates $(x_c, y_c)$ and coinciding with the line 383:

$$Z=((x_c-x_r)^2+(y_c-y_r)^2)^{1/2} \quad (15)$$

The values of Z, $x_r$, and $y_r$ of Eq. (15) are known according to previous the discussion. Therefore, when any specific y-coordinate value coinciding with a point on the line 383 is substituted for $y_c$ in Eq. (15), Eq. (15) can be solved for $x_c$, to determine the value of the associated specific x-coordinate of that point on the line 383. Thus, Eq. (15) characterizes a portion of the true continuous correlation function 305 in a region approximately symmetrically located about the extremum, or peak offset, of the true continuous correlation function 305 relative to the correlation function value point 804.

Next, as shown in the example of FIG. 16, a point 371 coinciding with the line 383 and having a y-coordinate value equal to the y-coordinate value $y_4$ of the correlation function value point 804, as indicated by the line 326, is determined. The point 371, is determined according to the preceding discussion, by substituting the y-coordinate value $y_4$ into Eq. (15). When the resulting Eq. (15) is solved for the x-coordinate value $x_c$, the resulting value of $x_c$ is assigned as the value of the x-coordinate $x_e$ of the point 371. The x-coordinate value of the point 371, $x_e$, is an estimate of the true x-coordinate value $x_t$ of a point 372 lying on the curve of the true continuous correlation function 305, and symmetrically located about the extremum, or peak offset, of the true continuous correlation function 305 relative to the correlation function value point 804.

Next, given the values of the x-coordinate $x_e$ and the x-coordinate of the correlation function value point 804, $x_4$, the peak offset can be estimated as the x-coordinate value midway between $x_e$ and $x_4$:

$$x_{peak\ offset}=(x_e+x_4)/2 \quad (16)$$

As shown in FIG. 16, the estimated peak offset, i.e., the x-coordinate value of the line 373, closely approximates the true peak offset, i.e., the x-coordinate value of the line 303. The error is approximately $(x_e-x_t)/2$.

Systematic estimation errors related to the asymmetry of the correlation function value points about the extremum, or peak offset value, are substantially rejected by this sixth exemplary embodiment of the systems and methods according to this invention. It should be appreciated that in various embodiments, one or more additional correlation function value points with correlation function values within a prescribed range of the correlation function value of the extreme correlation function value point may also be identified and excluded from the set of correlation function value points used in the sixth exemplary embodiment of the systems and methods according to this invention.

Furthermore, the correlation function value points used to determine the intersection point 353 need not be adjacent correlation function value points, provided that perpendicular bisectors analogous to the perpendicular bisector lines 380 and 381 can be constructed. Furthermore, in various other embodiments, for a given image type or product configuration, an approximate radius of curvature Z may be predetermined empirically, and considered known. In such embodiments, only one perpendicular bisector, defined by two correlation function value points as described above, is required, and the functional equivalent of coordinates ($x_r$, $y_r$) of FIG. 16, may still be determined. In such embodiments, the basic features and benefits of the sixth exemplary embodiment of the systems and methods according to this invention are retained.

Furthermore, in various other embodiments, a smooth curve analogous to the line 383, but having a relatively simple prescribed form other than a constant radius of curvature, is determined by a limited number of correlation function value points lying on one side of the correlation function extremum. The equation of the determined curve may be used in a manner analogous to the use of Eq. (15) described above, and the basic features and benefits of the sixth exemplary embodiment of the systems and methods according to this invention are retained.

Figure 17:
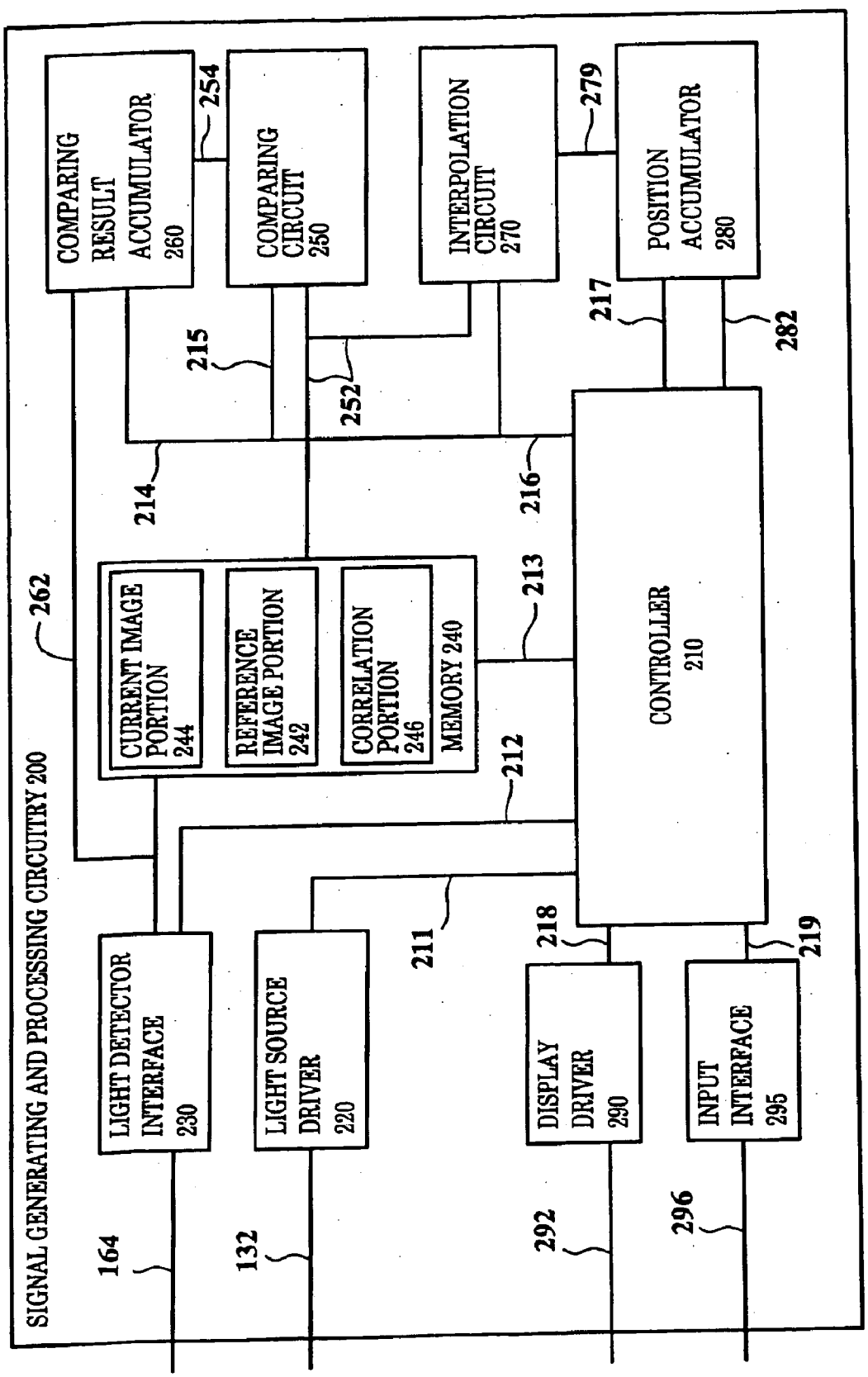
FIG. 17 is a block diagram outlining one exemplary embodiment of signal generating and processing circuitry of an image-based optical position transducer suitable for providing images and for determining image displacements according to this invention.

FIG. 17 is a block diagram outlining in greater detail one exemplary embodiment of the signal generating and processing circuitry 200 shown in FIG. 1. As shown in FIG. 17, the signal generating and processing circuitry 200 includes a controller 210, a light source driver 220, a light detector interface 230, a memory 240, a comparing circuit 250, a comparison result accumulator 260, an interpolation circuit 270, a position accumulator 280, a display driver 290 and an optional input interface 295.

The controller 210 is connected to the light source driver 220 by a control line 211, to the image detector interface 230 by a signal line 212, and to the memory 240 by a signal line 213. Similarly, the controller 210 is connected by signal lines 214–217 to the comparing circuit 250, the comparison result accumulator 260, the interpolation circuit 270 and the position accumulator 280, respectively. Finally, the controller 210 is connected to the display driver 290 by a control line 218 and, if provided, to the input interface 295 by a input signal line 219. The memory 240 includes a first, or reference, image portion 242, a second, or subsequent, image portion 244 and a correlation portion 246.

In operation, the controller 210 outputs a control signal over the signal line 211 to the light source driver 220. In response, the light source driver 220 outputs a drive signal to the light source 130 over the signal line 132. Subsequently, the controller 210 outputs a control signal to the image detector interface 230 and to the memory 240 over the signal lines 212 and 213 to store the signal portions received over the signal line 164 from the light detector 160 corresponding to each of the image elements 162 into the first, or reference, image portion 242 or the second, or subsequent, image portion 244. In particular, the image values from the individual image elements 162 are stored in a two-dimensional array in the first image portion 242 and the second image portion 244 corresponding to the positions of the individual image elements 162 in the array 166.

Once a first image is stored in the first image portion 242, the controller 210 waits the predetermined short time period to again output the control signal on the signal line 211 to the light source driver 220 to again drive the light source 130. The image detector interface 230 and the memory 240 are then controlled using signals on the signal lines 212 and 213 to store the resulting image in the second image portion 244.

Then, the controller 210 outputs a signal on the signal line 214 to the comparing circuit 250. In response, the comparing circuit 250 inputs an image value for a particular pixel from the first image portion 242 over a signal line 252 and inputs the image value for the corresponding pixel, based on the current offset, from the second image portion 244 over the signal line 252. The comparing circuit 250 then applies a correlation algorithm to determine a comparison result. Any appropriate correlation technique, known or later-developed, can be used by the comparing circuit 250 to compare the first image stored in the first image portion 242 with the second image stored in the second image portion 244 on a pixel-by-pixel basis based on the current offset. The comparing circuit 250 outputs the comparison result on a signal line 254 to the comparison result accumulator 260 for the current correlation offset.

Once the comparing circuit 250 has extracted and compared the image value for each of the image elements 162 from the first image portion 242 and compared them to the corresponding image value stored in the second image portion 244, and applied the correlation technique and output the comparison result to the comparison result accumulator 260, the value stored in the comparison result accumulator 260 defines the correlation value, corresponding to the current offset, in predetermined units, as exemplified in FIG. 7. The controller 210 then outputs a signal over the signal line 215 to the comparison result accumulator 260 and to the memory 240 over the signal line 213. As a result, the correlation algorithm result stored in the comparison result accumulator 260 is output and stored in the correlation portion 246 of the memory 240 at a location corresponding to the current offset.

The controller 210 then outputs a signal on the signal line 215 to clear the result accumulator 260. Once all of the comparisons for all of the desired offsets between the first image stored in the first image portion 242 and the second image stored in the second image portion 244 have been performed by the comparing circuit 250, and the results accumulated by the comparison result accumulator 260 and stored in the correlation portion 246 under control of the controller 210, the controller 210 outputs a control signal over the signal line 216 to the interpolation circuit 270.

In response, the interpolation circuit 270 inputs the correlation results stored in the correlation portion 246 over the signal line 252, and identifies correlation values coinciding with a peak or trough of the correlation function and interpolates using selected correlation function value points in the vicinity of the peak/trough of the correlation function to determine the peak offset value or image displacement value with sub-pixel resolution. The interpolation circuit 270 then outputs, under control of the signal over the signal line 216 from the controller 210, the determined estimated sub-pixel displacement value on a signal line 279 to the position accumulator 280. The position accumulator 280, under control of the signal over the signal line 217 from the controller 210, adds the estimated displacement value to an accumulated displacement stored in the position accumulator 280. The position accumulator 280 then outputs the updated position displacement to the controller 210 over the signal line 282.

In response, the controller 210 may output the updated displacement value to the display driver 290, if provided, over the signal line 218. The display driver 290 then outputs drive signals over the signal line 292 to the display device 107 to display the current displacement value.

One or more signal lines 296, if provided, allow an interface between an operator or a cooperating system and the controller 210. If provided, the input interface 295 may buffer or transform the input signals or commands and transmit the appropriate signal to the controller 210.

The operation of this system has been described with respect to first and second images that are acquired within a short time period of each other, as previously stated. However, in various other exemplary embodiments, it may be desirable to store a "permanent" reference image corresponding to a particular position for long time periods. That image can then be recalled at any later time to be used in place of the first or second images. For example, such an image might correspond to a reset, or "homing", position of a device. In this case, small deviations from the reset, or "homing", position can be detected at any later time, by comparing the permanent reference image to an image acquired at the later time. Thus, it should be understood that, in various exemplary embodiments of the systems and methods according to this invention, images stored for long time periods may always be used in place of the first or second images, and compared to a current second or first image, when it is appropriate for the system application.

Figure 18:
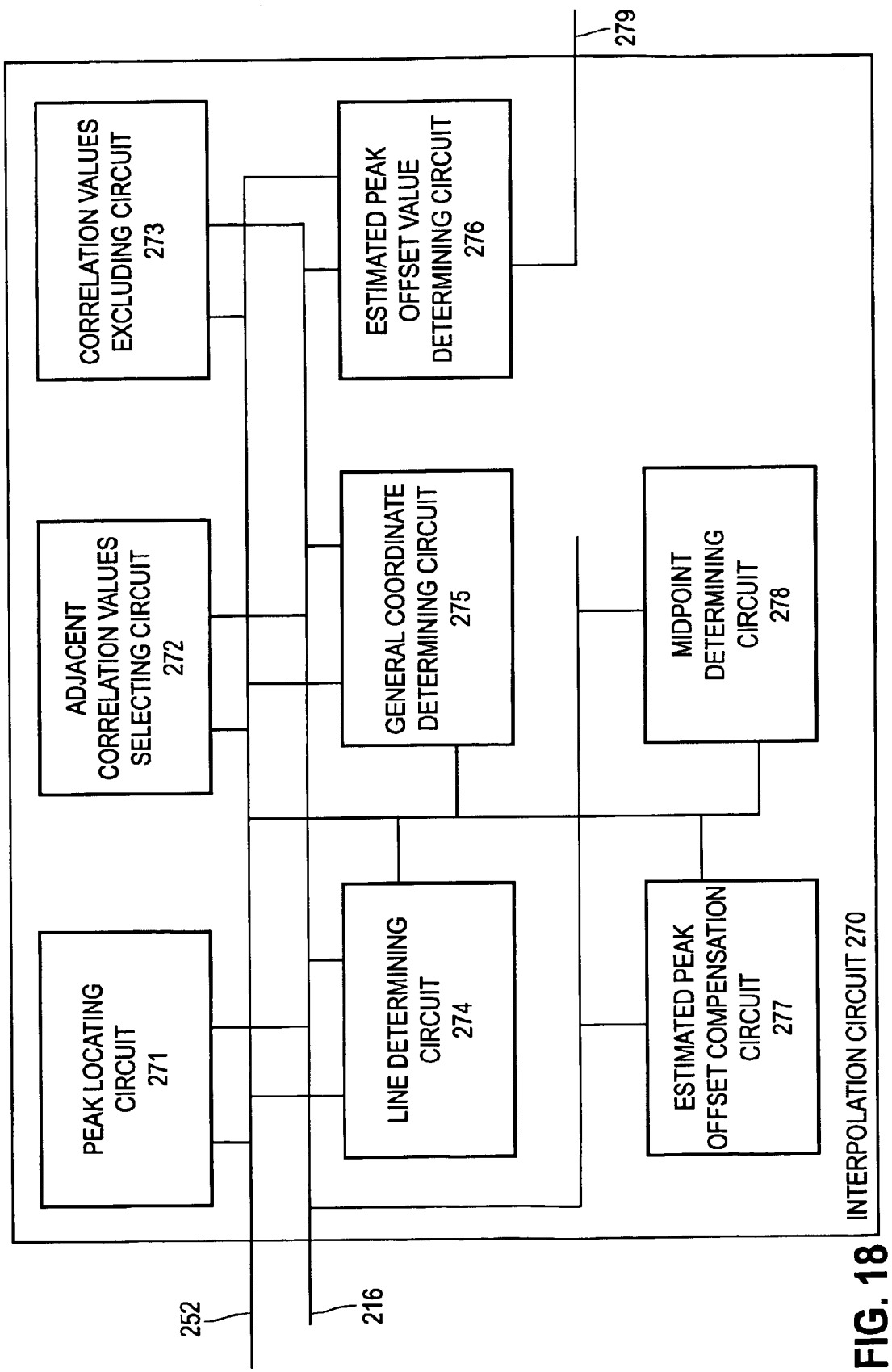
FIG. 18 is a block diagram outlining one exemplary embodiment of the interpolation circuit of FIG. 17 according to this invention.

FIG. 18 is a block diagram illustrating one exemplary embodiment of the interpolation circuit 270 of FIG. 17 according to this invention. As shown in FIG. 18, the interpolation circuit 270 includes one or more of a peak locating circuit 271, an adjacent correlation values selecting circuit 272, a correlation value excluding circuit 273, a line determining circuit 274, a general coordinate determining circuit 275, an estimated peak offset value determining circuit 276, an estimated peak offset compensation circuit 277 and/or a midpoint determining circuit 278.

The circuits 271–273, collectively or individually, constitute correlation function value point identification circuitry, suitably usable to select a plurality of correlation function value points usable by various embodiments of the systems and methods according to this invention. The circuits 271, 275 and 278, collectively or individually, constitute estimated coordinate identification circuitry, suitably usable to determine estimated spatial translation coordinates, and/or estimated correlation value coordinates usable by various embodiments of the systems and methods according to this invention.

As shown in FIG. 18, each of the circuits 271–278 are connected to the signal line 252 from the comparing circuit 250, and the control signal line 216 from the controller 210. As shown in FIG. 18, the estimated peak offset value determining circuit 276 is connected to the signal line 279 and provides the estimated offset or displacement value between the current image and the reference image to the position accumulator 280.

It should be appreciated that, depending on which of the first-eighth exemplary embodiments of the systems and methods for estimating displacement according to this invention is implemented in a particular signal generating and processing circuit 200, various ones of the circuits 271–278 can be omitted. For example, if the particular method implemented in a particular exemplary embodiment of the signal generating and processing circuit 200 does not exclude any correlation function value points, such as is done in the first and second exemplary embodiments described above, the correlation value excluding circuit 273 can be omitted.

Similarly, if the particular exemplary embodiment of the signal generating and processing circuit 200 does not implement the compensation for periodically occurring errors in the estimated peak value, as is done in the second exemplary embodiment described above, the estimated peak offset compensation circuit 277 could be omitted. Similarly, if the particular exemplary embodiment of the signal generating and processing circuit 200 does not implement any of the methods described above with respect to FIGS. 16, 19 or 20, which locate midpoints of lines extending between correlation function value points, the midpoint determining circuit 278 can be omitted.

It should also be appreciated that, in the exemplary embodiment of the interpolation circuit 270 shown in FIG. 18, the signal line 252 is used as an internal bus in the interpolation circuit 270 to transfer data between each of the implemented circuits 271–278. However, it should be appreciated that, in general, the peak locating circuit 271, the adjacent correlation values selecting circuit 272, or the correlation value excluding circuit 273 will need direct access to the correlation function value points determined by the comparing circuit 250.

Thus, each of the line determining circuit 274, the general coordinate determining circuit 275, the estimated peak offset value determining circuit 276, the estimated peak offset compensation circuit 277 and the midpoint determining circuit 278 can be internally connected within the interpolation circuit 270 to one or more of the peak locating circuit 271, the adjacent correlation value selecting circuit 272 and/or the correlation value excluding circuit 273 and to each other by one or more separate data buses or hardwired data connections between these various circuits 271–278. Thus, it should be appreciated that, the particular interconnections between the provided ones of the circuits 271–278 is a design choice that will be obvious and predictable to those of ordinary skill in the art in view of this disclosure.

In operation, depending on which one of the various first-eighth exemplary embodiments of the methods for determining the peak offset or displacement according to this invention is implemented in the interpolation circuit, the comparison results generated by the comparing circuit 250 are provided from the comparing circuit 250 to the interpolation circuit 270. In particular, the comparison results are provided to the peak locating circuit 271, which determines the peak correlation value point as a first one of the selected correlation function value points.

Once the peak locating circuit 271 has located the peak correlation value point, the adjacent correlation values selecting circuit 272 selects various adjacent correlation function value points that are required for the particular implemented method for determining the peak offset or displacement according to this invention as additional selected correlation value points. Then, the correlation value excluding circuit 273, if implemented for the particular implemented method for estimating the peak offset or displacement in the signal generating and processing circuit 200, excludes one or more of the selected correlation value points selected by the peak locating circuit and/or the adjacent correlation values selecting circuit 272.

Alternatively, if only the peak correlation function value point will be excluded, the correlation value excluding circuit 273 can exclude that point from the selected correlation function value points before the adjacent correlation value selecting circuit 272 selects the remaining adjacent correlation function value points.

Next, depending on the particular method for estimating the peak offset or displacement that is implemented in the interpolation circuit 270 of the signal generating and processing circuit 200, the line determining circuit 274, if implemented for the particular implemented method for estimating the peak offset or displacement in the signal generating and processing circuit 200, determines one or more lines presumed to correspond to at least a portion of the correlation function, based on one or more of the selected correlation function value points that remain after the correlation value excluding circuit 273, if used, excludes any of the selected correlation function value points.

Then, if the sixth, seventh or eighth exemplary embodiment, or any other exemplary embodiment that determines a midpoint between two previously defined, and in particular between two correlation function value points, is implemented in the interpolation circuit 270, the midpoint determining circuit 278 can be used to determine the midpoints.

Finally, the general coordinate determining circuit 275, again depending on the particular method for estimating the peak offset or displacement that is implemented in the interpolation circuit 270, and based on one or more of the lines determined by the line determining circuit 274, if implemented, and/or one or more midpoints determined by the midpoint determining circuit 278, if implemented, determines any remaining construction lines, intersection points, coordinate combinations and the like, according to the particular method for estimating the peak offset or displacement that is implemented in the interpolation circuit 270. The general coordinate determining circuit 275 further determines any particular set of spatial translation coordinates according to the particular method for estimating the peak offset or displacement that is implemented in the interpolation circuit 270.

The estimated peak offset value determining circuit 276 then estimates the x-axis value of the correlation function extremum value based on the estimated spatial translation coordinates, that is, the x-axis values, determined by the general coordinate determining circuit 275, along with the various lines and line segments generated by the line determining circuit 274 and the x-axis values of one or more of the selected correlation function value points, if required. The estimated peak offset value determining circuit 276 then outputs the estimated peak offset on the signal line 279 to the position accumulator 280.

It should be appreciated that, if the particular method for estimating the peak offset or displacement implemented in the interpolation circuit 270 includes applying the systematically varying error values, as shown in FIG. 9, in various exemplary embodiments, the estimated peak offset compensation circuit 277 will input the estimated peak offset determined by the estimated peak offset value determining circuit 276 and determine a compensation value for the estimated position of the estimated peak offset within the periodically recurring error curve. The estimated peak offset compensation circuit 277 will then output this compensation value to the estimated peak offset value determining circuit 276. The estimated peak offset value determining circuit 276 will then update or revise the estimated peak offset value based on the value from the estimated peak offset compensation circuit 277 before outputting the estimated peak offset on the signal line 279.

The signal generating and processing circuitry 200 is, in various exemplary embodiments, implemented using a programmed microprocessor or microcontroller and peripheral integrated circuit elements. However, the signal generating and processing circuitry 200 can also be implemented using a programmed general purpose computer, a special purpose computer, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing any one or more of the methods outlined above can be used to implement the signal generating and processing circuitry 200.

In FIG. 17, the memory 240 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory, a memory stick or the like. Similarly, the non-alterable or fixed memory can be implemented using any one or more of ROM, PROM, EPROM, EEPROM, an optical ROM disk, such as a CD-ROM or DVD-ROM disk, and associated disk drive, or the like.

Thus, it should be understood that each of the controller 210 and the other circuits 220–295 shown in FIGS. 17 and 18 can be implemented as portions of a suitably programmed general purpose computer. Alternatively, each of the controller 210 and the other circuits 220–295 shown in FIGS. 17 and 18 can be implemented as physically distinct hardware circuits within an ASIC, or using a FPGA, a PDL, a PLA or a PAL, or using discrete logic elements or discrete circuit elements. The particular form each of the circuits shown in FIGS. 17 and 18 will take is a design choice and will be obvious and predicable to those skilled in the art.

FIG. 19 shows a seventh exemplary embodiment of the systems and methods for estimating the peak offset or displacement according to this invention. FIG. 19 corresponds with FIG. 8, previously described, and corresponding features of FIGS. 8 and 19 are correspondingly numbered.

As shown in FIG. 19, a number of correlation function value points 801, 802, and 803 are spaced apart by an offset increment, as previously described. The correlation function value points 801, 802, and 803 are determined using the absolute value of difference correlation function and presumably lie on the true continuous correlation function 305. In this seventh exemplary embodiment of the systems and methods according to this invention, the x- and y-coordinate values of a point 411 are determined. The point 411 is the midpoint of a line segment 421, where the endpoints of the line segment 421 are the correlation function value points 801 and 803. Alternatively in this seventh exemplary embodiment of the systems and methods according to this invention, the x- and y-coordinate values of a point 412 are determined. The point 412 is the midpoint of a line segment 422, where the endpoints of the line segment 422 are the correlation function value points 802 and 803.

Next, the slope $S_{12}$ of the line 331 which passes through the correlation function value points 801 and 802, is determined according to Eq. (4), as previously described. Next, a line 423 is determined according to well-known methods. The line 423 is a unique line including either, or both, of the midpoints 411 or 412 and having the same slope as the line 331. Finally, a point 413 on the line 423, having a y-coordinate value $y_3$ equal to the y-coordinate value of the correlation function value point 803, is determined according to well-known methods. The x-coordinate value of the point 413 is the estimated peak offset according to this seventh exemplary embodiment of the systems and methods according to this invention.

In FIG. 19, the x-coordinate value of the point 413 is indicated by the line 313 that extends parallel to the y-axis. As shown, the estimated peak offset, i.e., the x-coordinate value of the line 313, approximates the true peak offset, i.e., the x-coordinate value of the line 303.

It should be noted that this seventh exemplary embodiment of the systems and methods according to this invention results in an estimated peak offset which is identical to the estimated peak offset according to the first exemplary embodiment of the systems and methods according to this invention. That is, the triangle defined by the points 411, 412 and 803 in FIG. 19 is geometrically similar to the triangle defined by the points 801, 802 and 803, but one-half the size. Therefore, according to the previous description, the point 413 is the midpoint of the line segment 324 and has the identical x-coordinate value as the peak offset value defined by Eq. (5) according to the first exemplary embodiment of the systems and methods according to this invention.

Since this seventh exemplary embodiment of the systems and methods according to this invention results in an estimated peak offset which is identical to the estimated peak offset according to the first exemplary embodiment of the systems and methods according to this invention, the accuracy or errors provided by these two embodiments are the same, and the results are interchangeable. However, it should be further noted that, in this seventh exemplary embodiment of the systems and methods according to this invention, the peak offset is estimated without determining any estimated points presumed to lie on the true continuous correlation function 305.

That is, rather than identifying the estimated point 401 and finding the midpoint of the line segment 324 defined by the endpoints 401 and 803, as described in the first exemplary embodiment, in this seventh exemplary embodiment at least one midpoint is found on a line defined by two "non-estimated" correlation function value points which lie on opposite sides of the extremum, or peak offset, of the true continuous correlation function 305. Given such a midpoint, either or both of a symmetric point and a corresponding peak offset may be determined in accordance with the principles of this invention by any of various methods. In this seventh exemplary embodiment of the systems and methods according to this invention, the exemplary method of finding the symmetric point is but one of several methods which are consistent with the principles of geometric similarity.

FIG. 20 shows an eighth exemplary embodiment of the systems and methods for estimating the peak offset or displacement according to this invention. FIG. 20 corresponds with FIG. 11, previously described, and corresponding features of FIGS. 11 and 20 are correspondingly numbered.

As shown in FIG. 20, a number of correlation function value points 801, 802, 803 and 804 are spaced apart by an offset increment, as previously described. The correlation function value points 801, 802, 803 and 804 are determined using the absolute value of difference correlation function and presumably lie on the true continuous correlation function 305. This eighth exemplary embodiment of the systems and methods according to this invention is similar to the seventh exemplary embodiment of the systems and methods according to this invention, except that the extreme correlation function value point is identified and excluded from the set of correlation function value points used to determine the peak offset value.

In FIG. 20, the correlation function value point 802, the minimum correlation function value point in FIG. 20, is so excluded. The inventors have determined that excluding the extreme correlation function value point further reduces estimation errors in comparison to the seventh exemplary embodiment of the systems and methods according to this invention. A superior estimate of the x-coordinate value of the peak offset can be derived from correlation function value points located where the correlation function can be well-approximated by the sparse correlation function value points. This is true because the shape of the correlation function near the extremum exhibits a high curvature and is not well-approximated by sparse correlation function value points or simple lower-order functions.

In this eighth exemplary embodiment of the systems and methods according to this invention, the x- and y-coordinate values of a point 415 are determined. The point 415 is the midpoint of a line segment 425, where the endpoints of the line segment 425 are the correlation function value points 801 and 804. Alternatively, in this eighth exemplary embodiment of the systems and methods according to this invention, the x- and y-coordinate values of a point 411 are determined. The point 411 is the midpoint of a line segment 421, where the endpoints of the line segment 421 are the correlation function value points 801 and 803.

Next, the slope $S_{34}$ of the line 332 which passes through the correlation function value points 803 and 804 is determined according to Eq. (4), as previously described. Next, a line 426 is determined according to well-known methods. The line 426 is a unique line including either, or both, of the midpoints 411 or 415 and having the same slope as the line 332. Finally, a point 416 on the line 426, having a y-coordinate value $y_1$ equal to the y-coordinate value of the correlation function value point 801, is determined according to well-known methods. The x-coordinate value of the point 416 is the estimated peak offset according to this eighth exemplary embodiment of the systems and methods according to this invention.

In FIG. 20, the x-coordinate value of the point 416 is indicated by the line 613 that extends parallel to the y-axis. As shown, the estimated peak offset, i.e., the x-coordinate value of the line 613, approximates the true peak offset, i.e., the x-coordinate value of the line 303.

It should be noted that this eighth exemplary embodiment of the systems and methods according to this invention results in an estimated peak offset which is identical to the estimated peak offset according to the third exemplary embodiment of the systems and methods according to this invention. That is, the triangle defined by the points 415, 411 and 801 in FIG. 20 is geometrically similar to the triangle defined by the points 804, 803 and 801, but one-half the size. Therefore, according to the previous description, the point 416 is the midpoint of the line segment 326 and has the identical x-coordinate value as the peak offset value defined by Eq. (7) according to the third exemplary embodiment of the systems and methods according to this invention.

Since this eighth exemplary embodiment of the systems and methods according to this invention results in an estimated peak offset which is identical to the estimated peak offset according to the third exemplary embodiment of the systems and methods according to this invention, the accuracy or errors provided by these two embodiments are the same, and the results are interchangeable. However, it should be further noted that in this eighth exemplary embodiment of the systems and methods according to this invention, the peak offset is estimated without determining any estimated points presumed to lie on the true continuous correlation function 305.

That is, rather than identifying the estimated point 401 and finding the midpoint of the line segment 324 defined by the endpoints 401 and 803, as described in the third exemplary embodiment, in this eighth exemplary embodiment at least one midpoint is found on a line defined by two "non-estimated" correlation function value points which lie on opposite sides of the extremum, or peak offset, of the true continuous correlation function 305. Given such a midpoint, either or both of a symmetric point and a corresponding peak offset may be determined in accordance with the principles of this invention by any of various methods. In this eighth exemplary embodiment of the systems and methods according to this invention, the exemplary method of finding the symmetric point is but one of several methods which are consistent with the principles of geometric similarity.

It should be appreciated that, in various exemplary embodiments, one or more additional correlation function value points with correlation function values within a prescribed range of the extreme correlation function value point may also be identified and excluded from the set of correlation function value points used in the eighth exemplary embodiment of the systems and methods according to this invention. In addition, it should be noted that the errors shown in the examples of FIGS. 19 and 20 are in opposite directions, relative to the true peak offset value corresponding to the line 303

Thus, it is apparent that estimates of the peak offset may be further improved by applying the seventh or eighth exemplary embodiments of the systems and methods according to this invention to several sets of correlation function value points, progressively farther from the extremum, and averaging the several resulting peak offsets. Many such variations exist for this and the other exemplary embodiments of the systems and methods according to this invention disclosed herein.

While this invention has been described in conjunction with graphical explanations of the exemplary systems and methods outlined above, it is evident that many alternative analytical methods, mathematical transformations, modifications and variations will be apparent to those skilled in the art. Furthermore, although many of the exemplary systems and methods herein have been presented according to an exemplary sequence of steps for purposes of explanation, it is evident that alternative sequences of steps, and sequences including alternative steps, will be apparent to those skilled in the art. Furthermore, the variety of systems and methods presented herein are indicative of a further variety of systems and methods that can be generated according to the basic problems and solutions disclosed herein.

Furthermore, correlation function value points outside the set depicted in these exemplary systems and methods may be used, and depicted correlation function value points may be omitted from such alternative sets, and the exemplary systems and methods described herein may still be easily adapted or extended to such alternative sets and applied with benefit, by those skilled in the art. Provided that such alternative methods, transformations, variations, correlation function value point selections and the like operate according to the principles discussed above, to reject the systematic estimation errors which are otherwise present when conventional sub-pixel estimation systems and methods are applied to a relatively limited number of correlation function value points, and especially when the correlation function value points are arranged asymmetrically, then such alternatives are considered to be insubstantial variations within the scope of this invention.

Furthermore, it should be appreciated that the displacement determining methods described herein for using a single direction in an imaging detector to measure displacement of a surface along a first axis can also be applied along a second orthogonal direction in an imaging detector, to measure displacement of the same surface along a second axis orthogonal to the first axis. This may be done using two separate and orthogonal 1-dimensional imaging detector arrays, using the two orthogonal directions of a 2-dimensional imaging detector array, or using two separate 2-dimensional detector arrays, where each detector array is used to measure displacement in one of the two orthogonal dimensions.

In addition, although the foregoing systems and methods according to this invention have been described primarily with reference to optical image sensing devices, any other known or later-developed type of sensor array can be used with the systems and methods according to this invention. Thus, for example, capacitive sensing arrays, such as those known to provide fingerprint images, and inductive sensing arrays, such as those known to provide robust bar-code images, also can provide first and second "images" useable with the systems and methods according to this invention.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for estimating a displacement of a second image acquired by a sensing device relative to a first image acquired by the sensing device, the method comprising:

determining a set of image-dependent correlation function value points indicative of a correlation function extremum, each image-dependent correlation function value point based at least partially on a pattern of image values included in both the first image and the second image, each image-dependent correlation function value point further based on a respective known spatial translation of the image values in the second image relative to the image values in the first image; and estimating at least one respective spatial translation position corresponding to at least one respective symmetry point based on a plurality of the image-dependent correlation function value points bounding the correlation function extremum, the at least one respective spatial translation position-indicative of the displacement of the second image relative to the first image.

wherein estimating the spatial translation position corresponding to the at least one respective symmetry point comprises determining the midpoint of at least one line segment having a first endpoint that is one of a) an image-dependent correlation function value point, and b) an estimated correlation function value point lying on the correlation function on a first side of the correlation function extremum, and a second endpoint that is one of a) an image-dependent correlation function value point, and b) an estimated correlation function value point lying on the correlation function on a second side of the correlation function extremum.

2. The method of claim 1, wherein the plurality of correlation function value points bounding the correlation function extremum excludes at least one correlation function value point which lies at a spatial offset bounded by other members of the plurality of correlation function value points.

3. The method of claim 2, wherein the excluded at least one correlation function value point comprises the correlation function value point which is nearest to the correlation function extremum.

4. The method of claim 2, wherein the excluded at least one correlation function value point comprises each correlation function value point which is within a prescribed range of spatial offsets from the correlation function extremum.

5. The method of claim 2, wherein the excluded at least one correlation function value point comprises each correlation function value point which is within a prescribed range of correlation function values.

6. The method of claim 1, wherein determining the image-dependent correlation function value points comprises determining a difference between paired image values, the paired image values comprising an image value included in the first image and a corresponding image value included in the second image, and summing absolute values of the differences between the paired image values for a set of paired image values.

7. The method of claim 1, wherein estimating the spatial translation position corresponding to the at least one symmetry point comprises:

estimating a first estimate of the spatial translation position corresponding to the at least one symmetry point including predictable systematic estimation errors related to asymmetry of the correlation function value points; and adjusting the first estimate of the spatial translation position corresponding to the at least one symmetry point, based at least partially on the predictable systematic estimation errors, to at least partially reject predictable systematic estimation errors related to the asymmetry of the correlation function value points about the correlation function extremum.

8. The method of claim 1, wherein one endpoint of the at least one line segment comprises an image-dependent correlation function value point, and the other end point comprises an estimated correlation function value point.

9. The method of claim 1, wherein each endpoint comprises an image-dependent correlation function value point, the at least one line segment comprises first and second line segments, and estimating the spatial translation position corresponding to the at least one respective symmetry point further comprises:

determining a line containing the midpoint of the first and second line segments, the line having a slope corresponding to the slope between the first end point of the first line segment and an adjacent end point of the second line segment lying on the same side of the correlation extremum; and determining a point on the line which has a y-coordinate value equal to the correlation function value of the second end point of at least one of the first and second line segments, wherein that point is taken as the respective symmetry point.

10. The method of claim 1, wherein estimating the spatial translation position corresponding to the at least one respective symmetry point comprises:

determining a first spatial translation position of a first point that is an image-dependent correlation function value point lying on the correlation function on a first side of the correlation function extremum; and determining a second spatial translation position of a second point that is an estimated correlation function value point lying on the correlation function on the second side of the correlation function extremum, at a correlation value equal to the correlation value of the first point; and determining the spatial translation position value which is midway between the first spatial translation position and the second spatial translation position.

11. The method of claim 10, wherein the estimated correlation function value point comprises a point lying on an estimated line segment which is estimated to correspond to the correlation function in the vicinity of the line segment.

12. The method of claim 11, wherein the estimated line segment corresponds to a line of constant curvature.

13. The method of claim 12, wherein the estimated line segment corresponds to a straight line.

14. An image-correlation optical position determining device, usable to estimate a displacement of a second image acquired by a sensing device relative to a first image acquired by the sensing device, the system comprising a signal generating and processing circuitry element that:

determines a set of image-dependent correlation function value points indicative of a correlation function extremum, each image-dependent correlation function value point based at least partially on a pattern of image values included in both the first image and the second image, each image-dependent correlation function value point further based on a respective known spatial translation of the image values in the second image relative to the image values in the first image; and estimates at least one respective spatial translation position corresponding to at least one respective symmetry point based on a plurality of the image-dependent correlation function value points bounding the correlation function extremum, the at least one respective spatial translation position indicative of the displacement of the second image relative to the first image, wherein estimate of the spatial translation position corresponding to the at least one respective symmetry point comprises determining the midpoint of at least one line segment having a first endpoint that is one of a) an image-dependent correlation function value point, and b) an estimated correlation function value point lying on the correlation function on a first side of the correlation function extremum, and a second endpoint that is one of a) an image-dependent correlation value point, and b) an estimated correlation function value point lying on the correlation function on the second side of the correlation function extremum.

15. The image-correlation optical position determining device according to claim 14, wherein the first and second images acquired by the sensing device comprise speckle images.

16. An image-correlation optical position determining device, usable to estimate a displacement of a second image acquired by a sensing device relative to a first image acquired by the sensing device, the device comprising:

means for determining a set of image-dependent correlation function value points indicative of a correlation function extremum, each image-dependent correlation function value point based at least partially on a pattern of image values included in both the first image and the second image, each image-dependent correlation function value point further based on a respective known spatial translation of the image values in the second image relative to the image values in the first image; and means for estimating at least one respective spatial translation position corresponding to at least one respective symmetry point based on a plurality of the image-dependent correlation function value points bounding the correlation function extremum, the at least one respective spatial translation position indicative of the displacement of the second image relative to the first image, wherein the means for estimating the spatial translation position corresponding to the at least one respective symmetry point comprises means for determining the midpoint of at least one line segment having a first endpoint that is one of
  a) a image-dependent correlation function value point, and
  b) an estimated correlation function value point lying on the correlation function on a first side of the correlation function extremum, and a second endpoint that is one of
  a) an image-dependent correlation function value point, 25 and
  b) an estimated correlation function value point lying on the correlation function on a second side of the correlation function extremum.

17. The image-correlation optical position determining device according to claim 16, further comprising means for acquiring the first image and the second image.

18. The image-correlation optical position determining device according to claim 16, wherein the first and second images acquired by the sensing device comprise speckle images.

19. The image-correlation optical position determining device according to claim 18, further comprising means for acquiring the first image and the second image.

20. An information storage medium that stores a program, executable on a processing device, for estimating a displacement of a second image acquired by a sensing device relative to a first image acquired by the sensing device, the program comprising:

instructions for determining a set of image-dependent correlation function value points indicative of a correlation function extremum, each image-dependent correlation function value point based at least partially on a pattern of image values included in both the first image and the second image, each image-dependent correlation function value point further based on a respective known spatial translation of the image values in the second image relative to the image values in the first image; and instructions for estimating at least one respective spatial translation position corresponding to at least one respective symmetry point, based on a plurality of image-dependent correlation function value points bounding the correlation function extremum, the at least one respective spatial translation position indicative of the displacement of the second image relative to the first image, wherein instructions for estimating the spatial translation position corresponding to the at least one respective symmetry point comprises determining the midpoint of at least one line segment having a first endpoint that is one of
  a) an image-dependent correlation function value point, and
  b) an estimated correlation function value point having on the correlation function on a first side of the correlation function extremum, and a second endpoint that is one of
  a) an image-dependent correlation function value point, and
  b) an estimated correlation function value point lying on the correlation function on the second side of the correlation function extremum.

21. The information storage medium of claim 20, wherein the instructions for estimating comprise instructions for excluding from the plurality of correlation function value points bounding the correlation function extremum at least one correlation function value point which lies at a spatial offset bounded by other members of the plurality of correlation function value points.

22. A method for estimating a displacement of a second image acquired by a sensing device relative to a first image acquired by the sensing device, the method comprising:

determining a set of image-dependent correlation function value points indicative of a correlation function extremum, each image-dependent correlation function value point based at least partially on a pattern of image values included in both the first image and the second image, each image-dependent correlation function value point further based on a respective known spatial translation of the image values in the second image relative to the image values in the first image; and estimating at least one respective spatial translation position corresponding to at least one respective symmetry point based on a plurality of the image-dependent correlation function value points bounding the correlation function extremum, the at least one respective spatial translation position indicative of the displacement of the second image relative to the first image;

wherein estimating the spatial translation position corresponding to the at least one respective symmetry point comprises:
  determining a first line including two image-dependent correlation function value points lying on the correlation function on a first side of the correlation function extremum, and
  determining a second line having a slope that is approximately the negative of the slope of the first line and that includes an image-dependent correlation function value point lying on the correlation function on a second side of the correlation function extremum and having a correlation function value in a range included within a range whose end points are the correlation function values of the two image-dependent correlation function value points included in the first line.

23. The method of claim 22, wherein the plurality of correlation function value points bounding the correlation function extremum excludes at least one correlation function value point which lies at a spatial translation position bounded by other members of the plurality of correlation function value points.

24. The method of claim 22, wherein estimating the spatial translation position comprises:
  estimating a first estimate of the spatial translation position including predictable systematic estimation errors related to asymmetry of the correlation function value points about the correlation function extremum; and
  adjusting the first estimate of the spatial translation position, based at least partially on the predictable systematic estimation errors, to at least partially reject predictable systematic estimation errors related to the asymmetry of the correlation function value points about the correlation function extremum.

25. The method of claim 22, wherein the first and second images comprise a speckle pattern.

26. An image-correlation optical position determining device, comprising:
a sensing device that receives light and that forms at least a first image based on respective received light and a second image based on respective received light; and
signal generating and processing circuitry that determines, based on the first and second images formed by the sensing device, a set of image-dependent correlation function value points indicative of a correlation function extremum and that estimates at least one respective spatial translation position corresponding to at least one respective symmetry point based on a plurality of the image-dependent correlation function value points bounding the correlation function extremum, the at least one respective spatial translation position-indicative of displacement of the second image relative to the first image;
wherein estimating the spatial translation position corresponding to the at least one respective symmetry point comprises:
determining a first line including two image-dependent correlation function value points lying on the correlation function on a first side of the correlation function extremum and
determining a second line having a slope that is approximately the negative of the slope of the first line and that includes an image-dependent correlation function value point lying on the correlation function on a second side of the correlation function extremum and having a correlation function value in a range included within a range whose end points are the correlation function values of the two image-dependent correlation function value points included in the first line.

27. A speckle-image-correlation optical position determining device, comprising:
a sensing device that receives light scattered from a portion of an optically diffusing surface that is movable relative to the sensing device and that is illuminated with coherent light, the sensing device forming at least a first image based on respective received light and a second image based on respective received light; and
signal generating and processing circuitry that estimates, based on the first and second images, a first plurality of correlation function value points indicative of a correlation function extremum and that estimates, based on a set of image-dependent correlation function values comprising at least some of the plurality of image-dependent correlation function value points, at least one respective spatial translation position indicative of the displacement of the second image relative to the first image;
wherein estimating the spatial translation position corresponding to at least one respective symmetry point comprises:
determining a first line including two image-dependent correlation function value points lying on the correlation function on a first side of the correlation function extremum, and
determining a second line having a slope that is approximately the negative of the slope of the first line and that includes an image-dependent correlation function value point lying on the correlation function on a second side of the correlation function extremum and having a correlation function value in a range included within a range whose end points are the correlation function values of the two image-dependent correlation function value points included in the first line.

28. An information storage medium that stores a program, executable on a processing device, for estimating a displacement of a second image acquired by a sensing device relative to a first image acquired by the sensing device, the program comprising:
instructions for determining a set of image-dependent correlation function value points indicative of a correlation function extremum, each image-dependent correlation function value point based at least partially on a pattern of image values included in both the first image and the second image, each image-dependent correlation function value point further based on a respective known spatial translation of the image values in the second image relative to the image values in the first image; and
instructions for estimating a spatial translation position based on a plurality of correlation function value points bounding the correlation function extremum, the spatial translation position representing the displacement of the second image relative to the first image;
wherein estimating the spatial translation position corresponding to at least one respective symmetry point comprises:
determining a first line including two image-dependent correlation function value points lying on the correlation function on a first side of the correlation function extremum, and
determining a second line having a slope that is approximately the negative of the slope of the first line and that includes an image-dependent correlation function value point lying on the correlation function on a second side of the correlation function extremum and having a correlation function value in a range included within a range whose end points are the correlation function values of the two image-dependent correlation function value points included in the first line.

29. The information storage medium of claim 28, wherein the instructions for estimating the at least one respective spatial translation position comprises instructions for estimating the correlation function curve over at least one range comprising spatial translation position values outside the vicinity of the correlation function extremum, and instructions for estimating the spatial translation position based on at least one characteristic of the estimated correlation function curve which is not local to the vicinity of the correlation function extremum.

30. The information storage medium of claim 29, wherein the at least one characteristic of the estimated correlation function curve which is not local to the vicinity of the correlation function extremum comprises the location of a presumed line of symmetry.

31. The information storage medium of claim 28, wherein the displacement of the second image relative to the first image is indicative of movement of a surface which moves relative to the sensing device.

32. The information storage medium of claim 28, wherein the first and second images comprise a speckle pattern.

33. An image-correlation optical position transducer readhead, usable to measure displacement relative to a member having an image-determining surface, the readhead comprising:

a sensing device that receives light reflected from the image-determining surface, the sensing device comprising a plurality of image elements that are sensitive to the reflected light, the plurality of image elements being spaced apart along at least a first direction, the image elements spaced along the first direction at a predetermined spacing, the predetermined spacing usable to determine the spatial translation of an image on the readhead, the spatial translation of the image on the readhead usable to determine the relative displacement of the readhead and the image-determining surface along a predetermined direction, a light detector interface circuit connected to the sensing device, the light detector interface circuitry outputting signal values from the image elements of the sensing device, the signal values representative of image intensities of the reflected light on those image elements, and a signal generating and processing circuitry element connected to the light detector interface circuit;

wherein the light reflected from the image-determining surface creates an intensity pattern on the plurality of image elements based on the relative position of the image-determining surface and the readhead;

the light detector interface circuitry outputs a signal value from at least some of the plurality of image elements, the signal values together comprising an image;

the signal generating and processing circuitry element inputs a first image corresponding to a first relative position of the image-determining surface and the readhead and stores a representation of the image;

the signal generating and processing circuitry element inputs a second image corresponding to a second relative position of the image-determining surface and the readhead;

the signal generating and processing circuitry element, based on the first and second images, determines a set of image-dependent correlation function value points indicative of a correlation function extremum; and the signal generating and processing circuitry element estimates a spatial translation position based on a plurality of image-dependent correlation function value points bounding the correlation function extremum, the spatial translation position representing the displacement of the second image relative to the first image;

wherein at least the image-dependent correlation function value point closest to the extremum is excluded from the plurality of image-dependent correlation function value points bounding the correlation function extremum, such that estimating the spatial translation position is not based on the image-dependent correlation function value point closest to the extremum.

34. The readhead of claim 33, wherein the signal generating and processing circuitry element determines a relative displacement between the image-determining surface and the read head along at least one axis, based on the spatial translation position.

35. The readhead of claim 33, wherein the image-correlation optical position transducer readhead is a speckle-image correlation optical position transducer readhead, the image-determining surface is an optically diffusing surface, and the light reflected from the image-determining surface is generated from a coherent light source.

36. A speckle-image-correlation optical position transducer readhead, usable to measure displacement relative to a member having an optically diffusing surface, the readhead comprising:

a sensing device that receives light scattered from a portion of the optically diffusing surface illuminated with coherent light, the sensing device comprising a plurality of image elements that are sensitive to the scattered light, the plurality of image elements being spaced apart along at least a first direction at a predetermined pitch, a light detector interface circuit connected to the sensing device, the light detector interface circuitry outputting signal values from the image elements of the sensing device, the signal values representative of image intensities of the scattered light on those image elements, and a signal generating and processing circuitry element connected to the light detector interface circuit; wherein:

the light detector interface circuitry outputs a signal value from at least some of the plurality of image elements, the signal values together comprising an image;

the signal generating and processing circuitry element inputs a first image corresponding to a first relative position of the optically diffusing surface and the readhead and stores a representation of the image;

the signal generating and processing circuitry element inputs a second image corresponding to a second relative position of the optically diffusing surface and the readhead;

the signal generating and processing circuitry element, based on the first and second images, estimates a first plurality of correlation function value points indicative of a correlation function extremum;

the signal generating and processing circuitry element, based on a set of correlation function value points comprising at least some of the plurality of correlation function value points, estimates a spatial translation position representing the displacement of the second image relative to the first image; and wherein, for the speckle-image-correlation optical position transducer readhead, a ratio of peak-to-peak systematic error which repeats at a period corresponding to one image element pitch to the number of correlation function value points in the set used to determine the spatial translation position is not more than about 0.02 parts of the image element pitch per correlation function value point, when the peak-to-peak systematic error is expressed as a fraction of the image element pitch.

37. The speckle-image-correlation optical position transducer readhead of claim 36, wherein the ratio is not more than about 0.01 parts of the image element pitch per correlation function value point.

38. The speckle-image-correlation optical position transducer readhead of claim 36, wherein the ratio is not more than about 0.005 parts of the image element pitch per correlation function value point.

* * * * *